US010367623B2

United States Patent
Thubert et al.

(10) Patent No.: US 10,367,623 B2
(45) Date of Patent: Jul. 30, 2019

(54) DATA TRAFFIC MANAGEMENT IN VIRTUAL ACCESS POINT (VAP) ENABLED NETWORKS

(71) Applicant: Cisco Technology, Inc., San Jose, CA (US)

(72) Inventors: Pascal Thubert, La Colle sur Loup (FR); Jean-Philippe Vasseur, Saint Martin d'uriage (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 15/498,715

(22) Filed: Apr. 27, 2017

(65) Prior Publication Data

US 2018/0124632 A1 May 3, 2018

Related U.S. Application Data

(60) Provisional application No. 62/415,368, filed on Oct. 31, 2016.

(51) Int. Cl.
*H04L 5/00* (2006.01)
*H04W 28/02* (2009.01)
(Continued)

(52) U.S. Cl.
CPC .............. *H04L 5/0055* (2013.01); *H04L 1/00* (2013.01); *H04L 47/34* (2013.01); *H04L 49/201* (2013.01);
(Continued)

(58) Field of Classification Search
CPC ....... H04L 5/0055; H04L 47/14; H04L 47/32; H04L 47/34; H04L 49/201; H04L 67/12;
(Continued)

(56) References Cited

U.S. PATENT DOCUMENTS

| 7,724,766 B2 * | 5/2010 | Liao ...................... H04W 74/06 370/328 |
| 7,881,340 B2 * | 2/2011 | Farrag ................... H04W 74/02 370/468 |

(Continued)

FOREIGN PATENT DOCUMENTS

EP 2995041 A2 3/2016

OTHER PUBLICATIONS

"Soft handover", https://en.wikipedia.org/wiki/Soft_handover, Jul. 7, 2013, 1 page, Wikimedia Foundation, Inc.
(Continued)

*Primary Examiner* — Alpus Hsu
(74) *Attorney, Agent, or Firm* — Behmke Innovation Group LLC; James Behmke; Stephen D. LeBarron

(57) ABSTRACT

In one embodiment, a supervisory device in a network forms a virtual access point (VAP) for a node in the network whereby a plurality of access points (APs) in the network are mapped to the VAP as part of a VAP mapping. The node treats the APs in the VAP mapping as a single AP for purposes of communicating with the network. The supervisory device determines a data traffic management strategy for the node based on traffic associated with the node. The supervisory device instructs the APs in the VAP mapping to implement the data traffic management strategy for the node.

16 Claims, 21 Drawing Sheets

(51) Int. Cl.
*H04L 12/801* (2013.01)
*H04L 12/931* (2013.01)
*H04L 1/00* (2006.01)
*H04L 29/08* (2006.01)
*H04W 84/18* (2009.01)
*H04W 88/00* (2009.01)

(52) U.S. Cl.
CPC ......... *H04W 28/0263* (2013.01); *H04L 67/12* (2013.01); *H04W 84/18* (2013.01); *H04W 88/00* (2013.01)

(58) Field of Classification Search
CPC . H04W 28/0263; H04W 28/06; H04W 48/20; H04W 84/12; H04W 88/08; H04W 88/12
See application file for complete search history.

(56) References Cited

U.S. PATENT DOCUMENTS

| | | | |
|---|---|---|---|
| 8,140,704 B2 | 3/2012 | Archer et al. | |
| 8,863,235 B2* | 10/2014 | Huber | G06Q 20/1235 726/3 |
| 8,966,029 B2* | 2/2015 | Zhang | H04L 41/0823 709/221 |
| 9,026,039 B2* | 5/2015 | Wang | H04B 7/155 455/7 |
| 9,124,547 B2 | 9/2015 | Bhanage et al. | |
| 9,179,330 B2* | 11/2015 | Hamdi | H04W 24/02 |
| 9,210,534 B1 | 12/2015 | Matthieu et al. | |
| 9,226,201 B2 | 12/2015 | Smadi et al. | |
| 9,332,497 B2* | 5/2016 | Bhanage | H04W 52/0216 |
| 9,344,161 B2* | 5/2016 | Kish | H04B 7/0408 |
| 9,405,591 B2 | 8/2016 | Bhanage et al. | |
| 9,763,094 B2* | 9/2017 | Thelen | H04L 63/083 |
| 9,967,709 B2* | 5/2018 | Patel | G01S 11/06 |
| 2006/0165103 A1* | 7/2006 | Trudeau | H04L 12/2854 370/401 |
| 2011/0013608 A1* | 1/2011 | Lee | H04W 72/04 370/338 |
| 2013/0044735 A1 | 2/2013 | Lee et al. | |
| 2016/0044513 A1* | 2/2016 | Hamdi | H04W 24/02 726/3 |
| 2016/0044593 A1 | 2/2016 | Anpat et al. | |
| 2016/0072638 A1 | 3/2016 | Amer et al. | |
| 2016/0112917 A1 | 4/2016 | Bharghavan et al. | |
| 2016/0337212 A1 | 11/2016 | Shanks et al. | |
| 2017/0142644 A1* | 5/2017 | Yun | H04L 67/303 |
| 2017/0289837 A1* | 10/2017 | Duo | H04L 47/2433 |

OTHER PUBLICATIONS

"LoRa Alliance™ Technology", https://www.lora-alliance.org/What-Is-LoRa/Technology, Accessed Jan. 4, 2017, 2 pages, LoRa Alliance.

"Virtual Access Point Software for Windows 7", http://www.virtualaccesspoint.com/, Accessed Jan. 4, 2017, 1 page, virtualaccesspoint.com.

"VirtualAPs", ArubaOS—Chapter 5, http://www.arubanetworks.com/techdocs/ArubaOS_61/ArubaOS_61_UG/VirtualAPs.php, Accessed Jan. 4, 2017, Arubanetworks.com.

"What Is a Virtual Access Point?", SonicOS 6.2—Administration Guide, https://documents.software.dell.com/sonicos/6.2/administrationguide/sonicpoint/configuring-virtual-access-points/sonicpoint-virtual-access-point/sonicpoint-vap-overview/what-is-a-virtual-access-point, 1 page, Aug. 26, 2016, Quest Software Inc.

* cited by examiner

DATA TRAFFIC MANAGEMENT IN VIRTUAL ACCESS POINT (VAP) ENABLED NETWORKS

RELATED APPLICATION

This application claims priority to U.S. Provisional Patent Appl. No. 62/415,368, filed on Oct. 31, 2016, entitled DATA TRAFFIC MANAGEMENT IN VIRTUAL ACCESS POINT (VAP) ENABLED NETWORKS, by Thubert, et al., the contents of which are incorporated herein by reference.

TECHNICAL FIELD

The present disclosure relates generally to computer networks, and, more particularly, to data traffic management in virtual access point (VAP) enabled networks.

BACKGROUND

The Internet of Things (IoT) is the internetworking of devices or objects (a.k.a., "things", e.g., sensors, actuators, nodes, vehicles, etc.) that collect and exchange data, control objects, and process data. Many IoT networks are formed on low-power lossy networks (LLNs), and utilize carrier sense multiple access with collision avoidance (CSMA/CA) techniques. CSMA/CA, notably, is a communication technique that uses carrier sensing, where nodes attempt to avoid collisions by transmitting only when the channel is sensed to be "idle."

In general, deterministic routing concerns ensuring that messages (e.g., packets) definitively arrive at a destination at a specific time or within a specified time range. However, implementing determinism in hub-and-spoke IoT models, particularly with CSMA/CA, faces a litany of drawbacks, such as overwhelming a server with multiple copies of traffic, excessive delay, surges in latency, and unacceptable frame loss.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
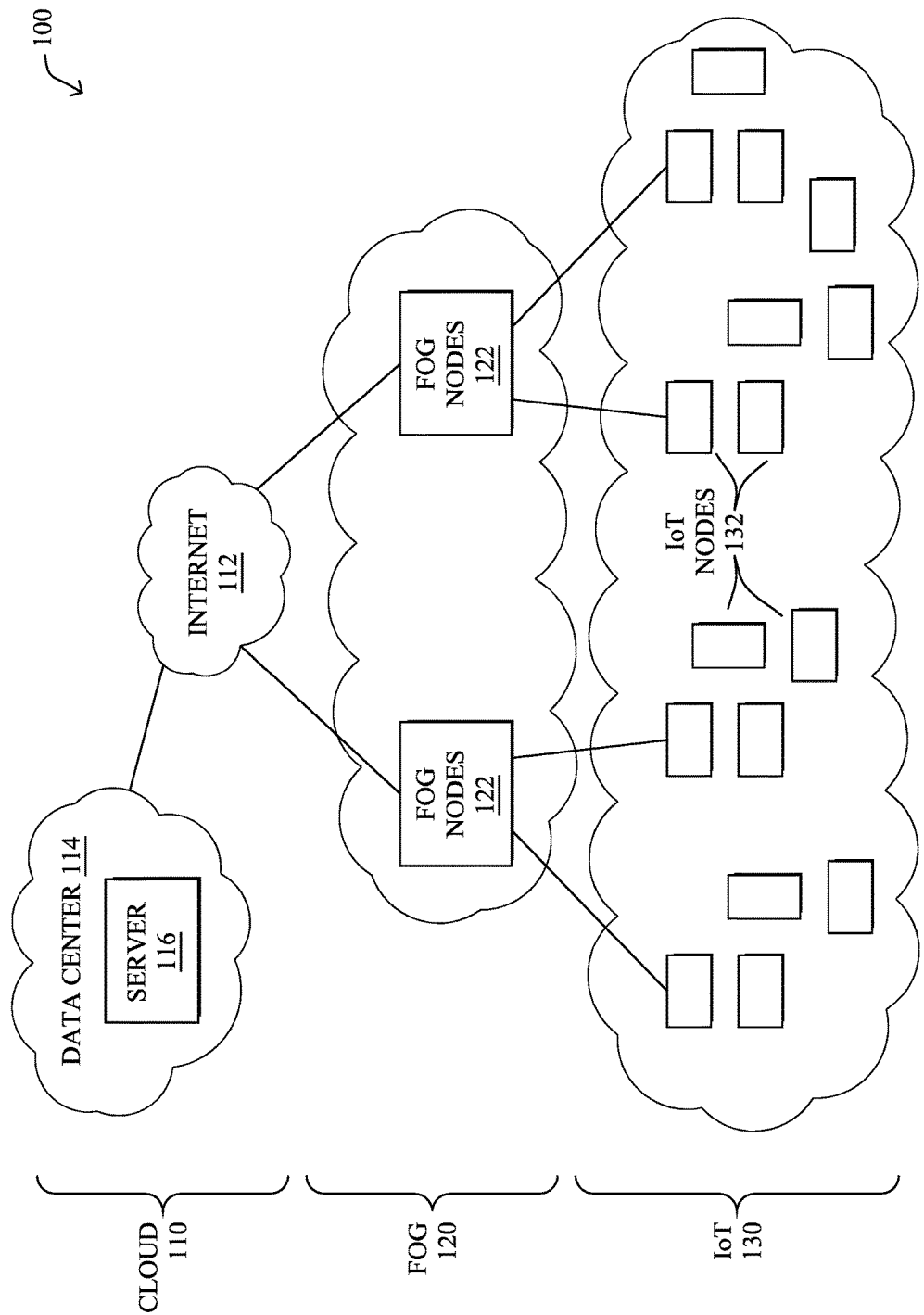
FIG. 1 illustrates an example communication network.

According to one or more embodiments of the disclosure, a supervisory device in a network forms a virtual access point (VAP) for a node in the network whereby a plurality of access points (APs) in the network are mapped to the VAP as part of a VAP mapping. The node treats the APs in the VAP mapping as a single AP for purposes of communicating with the network. The supervisory device determines a data traffic management strategy for the node based on traffic associated with the node. The supervisory device instructs the APs in the VAP mapping to implement the data traffic management strategy for the node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
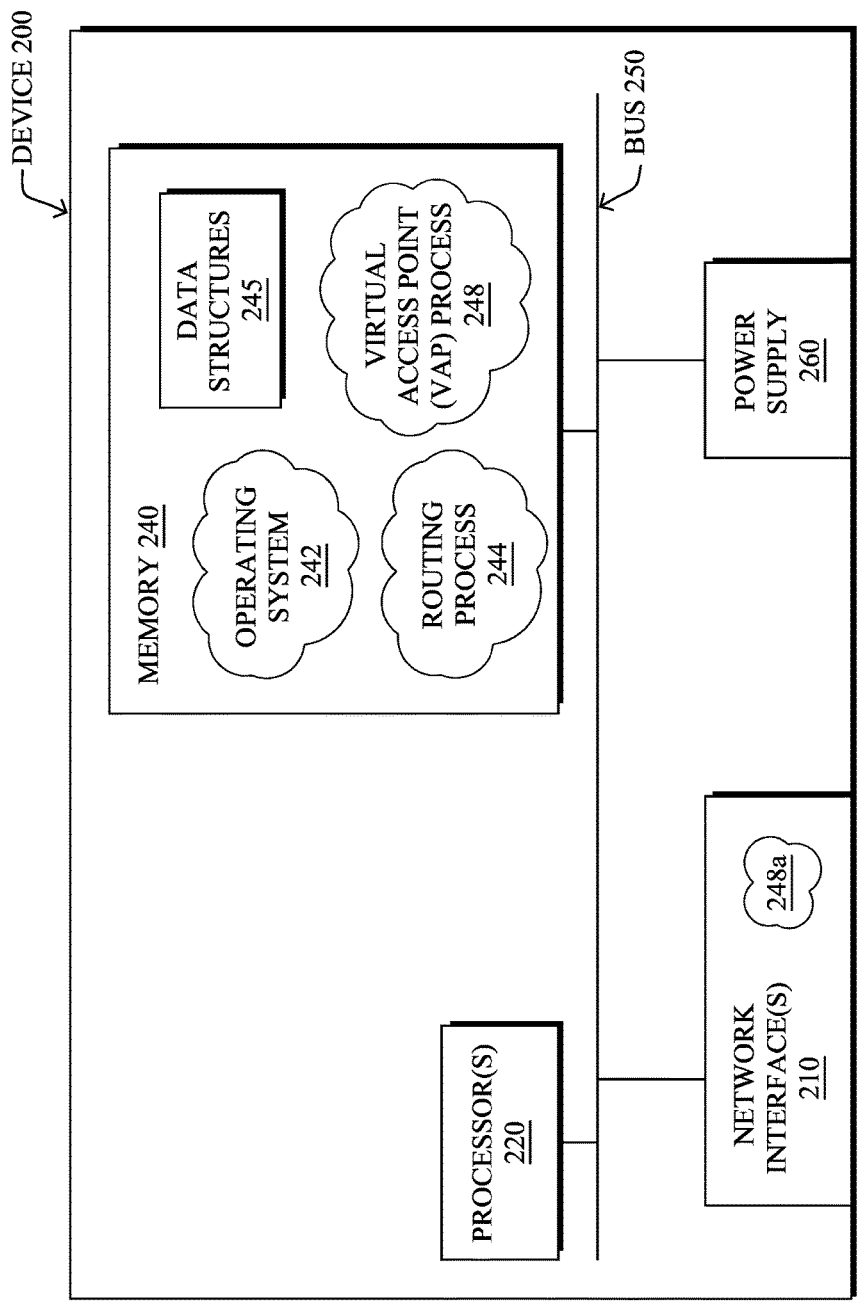
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process/services 244 and an illustrative virtual access point (VAP) process 248, as described herein. Note that while VAP process 248 is shown in centralized memory 240, alternative embodiments provide for the process to be specifically operated within the network interfaces 210, such as a component of a MAC layer (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, VAP process 248 includes computer executable instructions that, when executed by processor(s) 220, cause device 200 to perform operations regarding the formation, adjustment, and operation of a VAP within the network. These operations are described in greater detail below. In some embodiments, process 248 may employ any number of machine learning techniques, to perform these operations. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process 248 can use the model M to classify new data points, such as information regarding the performance/characteristics associated with an established VAP or its underlying APs, to adjust the VAP, accordingly. Often, M is a statistical model, and the cost function is inversely proportional to the likelihood of M, given the input data.

In various embodiments, VAP process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample network data that may be labeled simply as representative of a "good connection" or a "bad connection." On the other end of the spectrum are unsupervised techniques that do not require a training set of labels. Notably, while a supervised learning model may look for previously seen network data that has been labeled accordingly, an unsupervised model may instead look to whether there are sudden changes in the performance of the network and/or the VAP. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly labeled a connection as bad. Conversely, the false negatives of the model may refer to the number of connections that the model labels as 'good,' but are, in fact, of poor quality to the user or endpoint node. True negatives and positives may refer to the number of times the model correctly classifies a connection as good or bad, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. In some cases, process 248 may also use reinforcement learning techniques which generally act to use feedback about the ML predictions, to adjust the underlying model. For example, an indication of a false positive from an expert (e.g., a supervisory system or user) may be used to adjust the underlying model, to avoid such predictive mistakes in the future.

As mentioned above, various protocols have been established for the IoT, including, in particular, various "hub-and-spoke" models, such as Bluetooth Low Energy, DECT-Ultra Low Energy, IEEE 802.15.4 (with no meshing), and Low Power Wi-Fi. However, there is also a lack of determinism in these models due to prevalent use of carrier sense multiple access with collision avoidance (CSMA/CA) for wireless communications. Notably, deterministic networking requires that the worst-case data loss and latency should be guaranteed in a consistent fashion as multiple services are deployed on a common converged network infrastructure. This determinism is key to many applications, such as safety and process control. To complicate matters further, considering the vast amounts of devices that are currently being installed in various IoT networks, an important constraint to be placed on any solution is that changes at the end device (e.g., IoT device/thing) should not be necessary. This would also enable connection of legacy devices, thereby addressing a much wider market of applicability.

Virtual Access Point (VAP) Formation

The techniques herein introduce a methodology that can be used with existing IoT infrastructure to implement a virtual access point (VAP) that is unique to a given IoT node. In general, the VAP is a logical entity that appears to the endpoint node as a normal AP to which the node associates as normal. In practice, however, the VAP is physically distributed over a number of APs surrounding the device. In another aspect, a supervisory device in the network may control the AP membership in the VAP, such as by transferring AP membership in the network while the node moves and without requiring the node to roam. In further aspects, a machine learning model of the supervisory device may oversee the VAP and adjust the VAP mapping, accordingly. Such a machine learning model may reside in the supervisory device (e.g., controller, cloud service, etc.) in a centralized mode, or in a distributed manner across the APs. Depending on the traffic criticality, more or less of those APs may copy a given frame received from the endpoint node to the supervisory device.

Illustratively, the techniques described herein may be performed by hardware, software, and/or firmware, such as in accordance with virtual access point (VAP) process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

Specifically, according to one or more embodiments of the disclosure, a supervisory device in a network receives from a plurality of APs in the network data regarding a network availability request broadcast by a node seeking to access the network and received by the APs in the plurality. The supervisory device uniquely associates the node with a VAP for the node and forms a VAP mapping between the VAP for the node and a set of the APs in the plurality selected based on the received data regarding the network availability request. One of the APs in the mapping is designated as a primary access point for the node. The supervisory device instructs the primary AP to send a network availability response to the node that includes information for the VAP. The node uses the information for the VAP to access the network via the set of APs in the VAP mapping.

Operationally, the techniques herein specify an architecture and protocol between a supervisory device in a network (e.g., a controller, such as a network server) and a plurality of network access points (APs). The supervisory device may be configured for use with any of the technologies, noted above. Note that the techniques herein illustratively place a number of functions in the supervisory device, such as components hosting Machine Learning (ML) processes, also referred to as "learning machines") that are mostly technology-independent. In some embodiments, these processes may be implemented in a distributed manner (e.g., across different APs), in which case the collective set of APs may be viewed as the supervisory device.

More specifically, the techniques herein enable the formation and use of a VAP that appears to always be "near" an endpoint node, so that quality of transmission and PHY speed can be maintained. A VAP may be instantiated within a set of APs around the node, and the set may vary automatically under the control of the supervisory device (e.g., a controller hosting a machine learning model) within the infrastructure. Thus, the device never needs to make a decision of roaming, which is a paradigm change in Wi-Fi and other wireless networks. Also, since multiple APs can receive a same packet at a same time with unrelated probabilities, the overall chances of reception are increased and delays related to retries are reduced, thus helping with determinism.

Generally, a VAP may include any number of physical APs in the network that are placed in groups of equivalence, all using the same channel and security settings.

When a node (e.g., a STA) associates with the network, the supervisory device (e.g., controller) may select a set of APs that together form a VAP for the associated node. The set may be changed as the node moves. In this way, the endpoint node may experience a constant service from the network and does not roam. For joining, the node may interact with one of the APs (e.g., a primary networking AP) and may use a unique network identifier associated with the VAP, such as a unique service set identifier (SSID), a PAN-ID, or the like, that the node uses to access the network. The supervisory device may also optimize the set of APs based on an objective function and on the observed traffic in the network. Diversity is obtained because multiple members of the VAP may receive the same packet from the node, with relatively independent chances of success.

The illustrative VAP protocol described herein also integrates well with deterministic networking (DetNet). In particular, the VAP protocol enables multiple APs to receive a packet from an endpoint node at the same time, creating a natural replication mechanism in which multiple copies of a same packet may be captured, each by a different AP participating in the VAP assigned to the node. Those APs may be connected over different networks and the packet may circulate to the router or the final destination over segregated paths. DetNet elimination may then be used to eliminate duplicate copies, if any. The VAP protocol herein also leverages various networking techniques (e.g., Wi-Fi, controllers, ML processes, etc.), to improve the user experience while maintaining compatibility with the existing network standards and existing endpoint nodes, by creating a virtual AP that is always there and always optimized so the node never tries to roam.

Figure 3A:
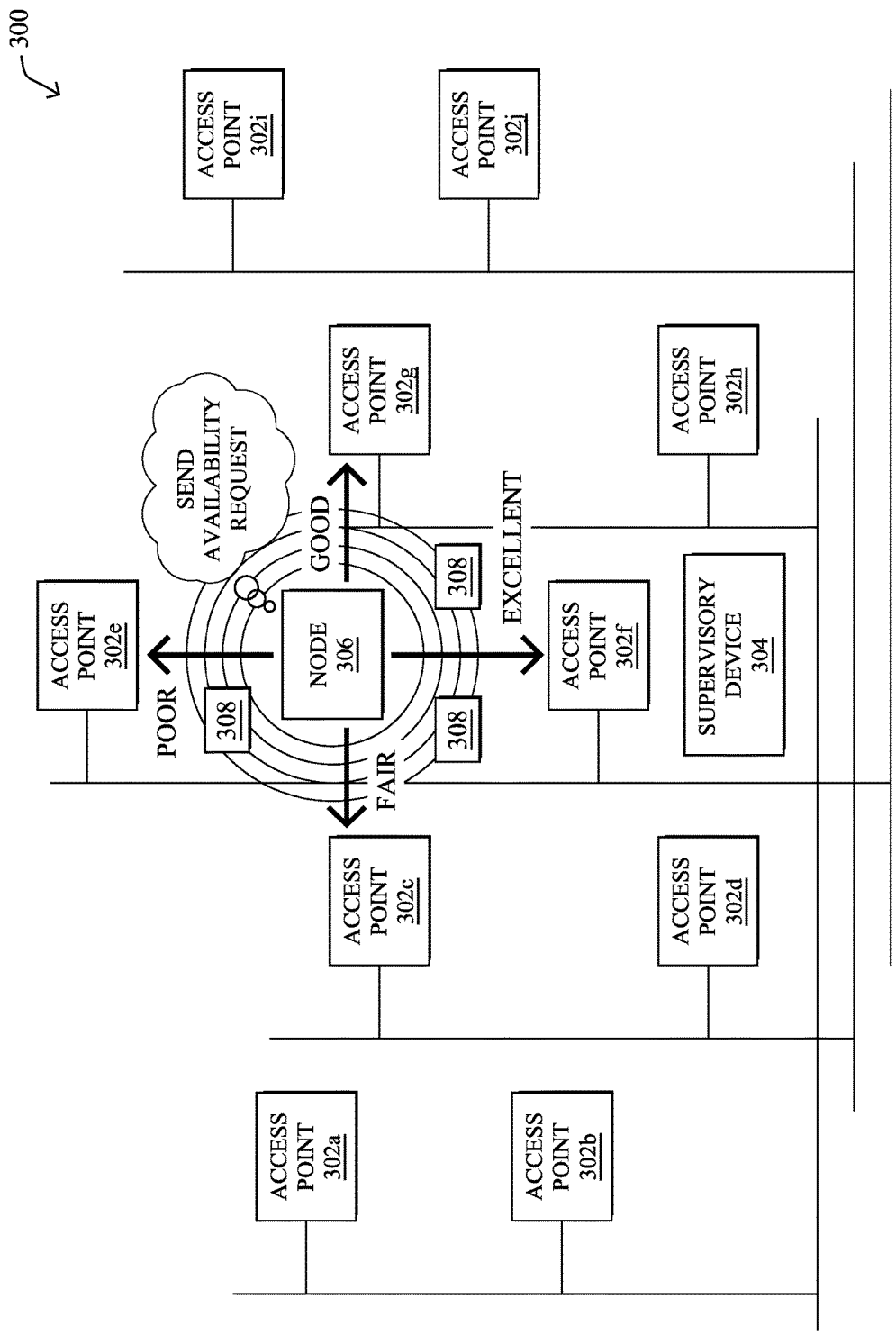
FIGS. 3A-3D illustrate an example of virtual access point (VAP) formation.

FIGS. 3A-3D illustrate an example of virtual access point (VAP) formation, according to various embodiments. As shown in FIG. 3A, assume that there exists a portion 300 of a network that includes a plurality of APs 302 (e.g., APs 302a-302j) that are located in different physical locations through an area (e.g., a building, campus, etc.). APs 302 may be in communication with a supervisory device 304 in the network, such as a wireless controller, other networking device, or, alternatively, a remote device, such as a server located in a data center or cloud computing environment.

Now, assume that a node 306 is attempting to access the network. In such a case, node 306 may broadcast a network availability request 308. The specific format of request 308 may be a function of the specific wireless protocols in use by the network. For example, in the case of 802.11 networks, availability request 308 may be a probe request. As would be appreciated, from the standpoint of node 306, the expected availability response would include an identifier for the available network, such as the SSID of the Wi-Fi network. Reception of availability request 308 by any of APs 302 may trigger the formation of a VAP for node 306, in various embodiments. In further embodiments, a VAP may also be formed at any time after node 306 associates with the network.

In many network implementations, a plurality of APs 302 may receive the broadcast network availability request 308 from node 306, with varying results. Notably, APs 302 within range of node 306 may, by virtue of receiving request 308, capture data regarding request 308, including the contents of request 308 and other characteristics of the received request 308 such as, but not limited to, a link quality indicator (LQI), a signal to noise ratio (SNR), or received signal strength indicator (RSSI), or the like. For example, as shown, AP 302f, which is physically located closest to node 306, may determine that the quality of the received request 308 is "excellent." Similarly, APs 302g, 302c, and 302e may determine that the quality of the received request 308 is "good," "fair," and "poor," respectively.

Figure 3B:
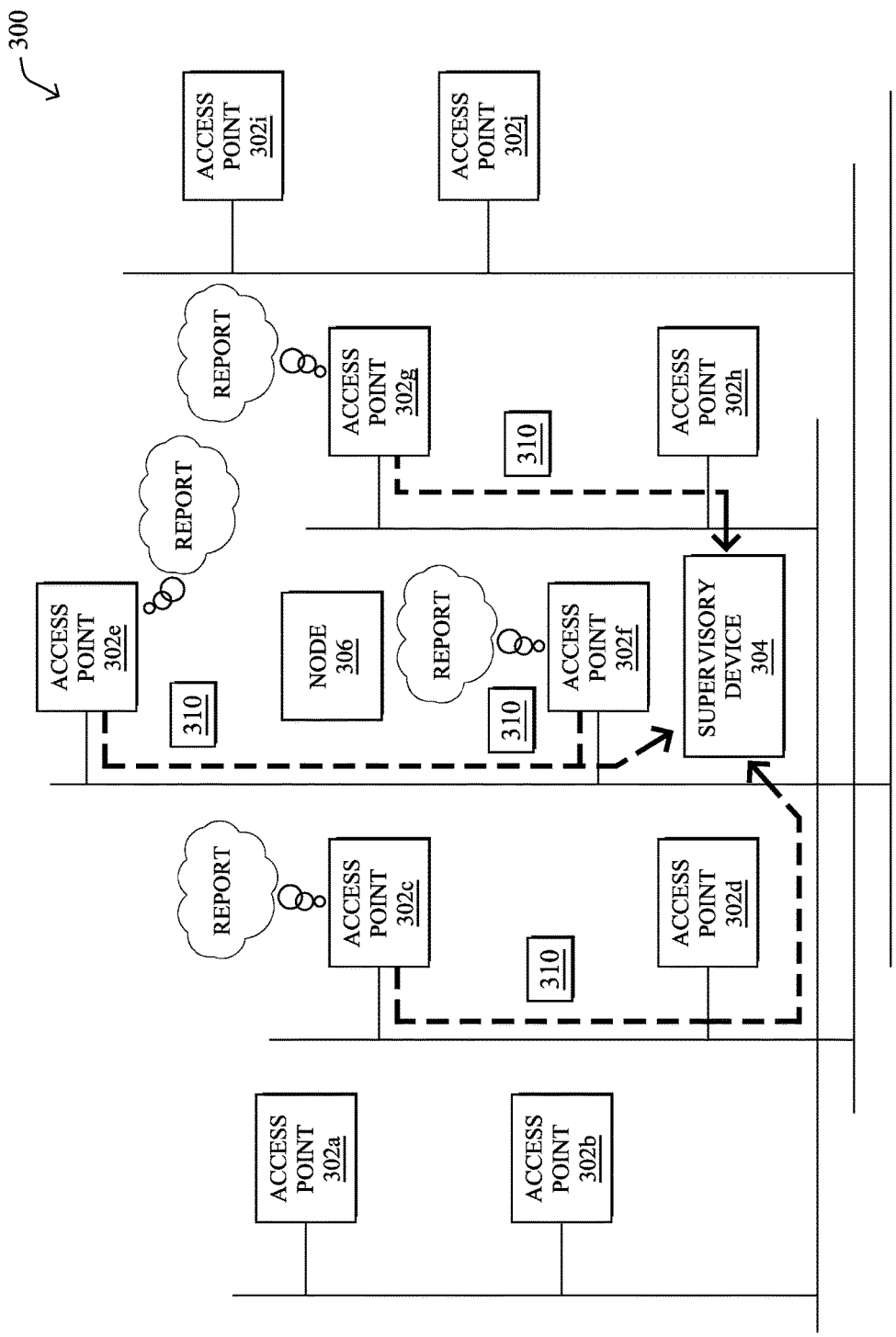

In various embodiments, rather than simply responding to request 308 with the requisite information needed for node 306 to associate with the network, the receiving APs 302 may instead report the captured data regarding request 308 to supervisory device 304. In particular, as shown in FIG. 3B, APs 302c, 302e, 302f, and 302g may send the data 310 regarding the received network availability request 308 from node 306 to supervisory device 304, thereby triggering the formation of a VAP for node 306. Data 310 may include, for example, the identity of the sending AP 302 that received request 308, a MAC address or other networking device identifier for node 306, security status information, and/or at least one metric of the quality of the communication with the node (e.g., signal strength, signal to noise ratio, signal quality, etc.).

Figure 3C:
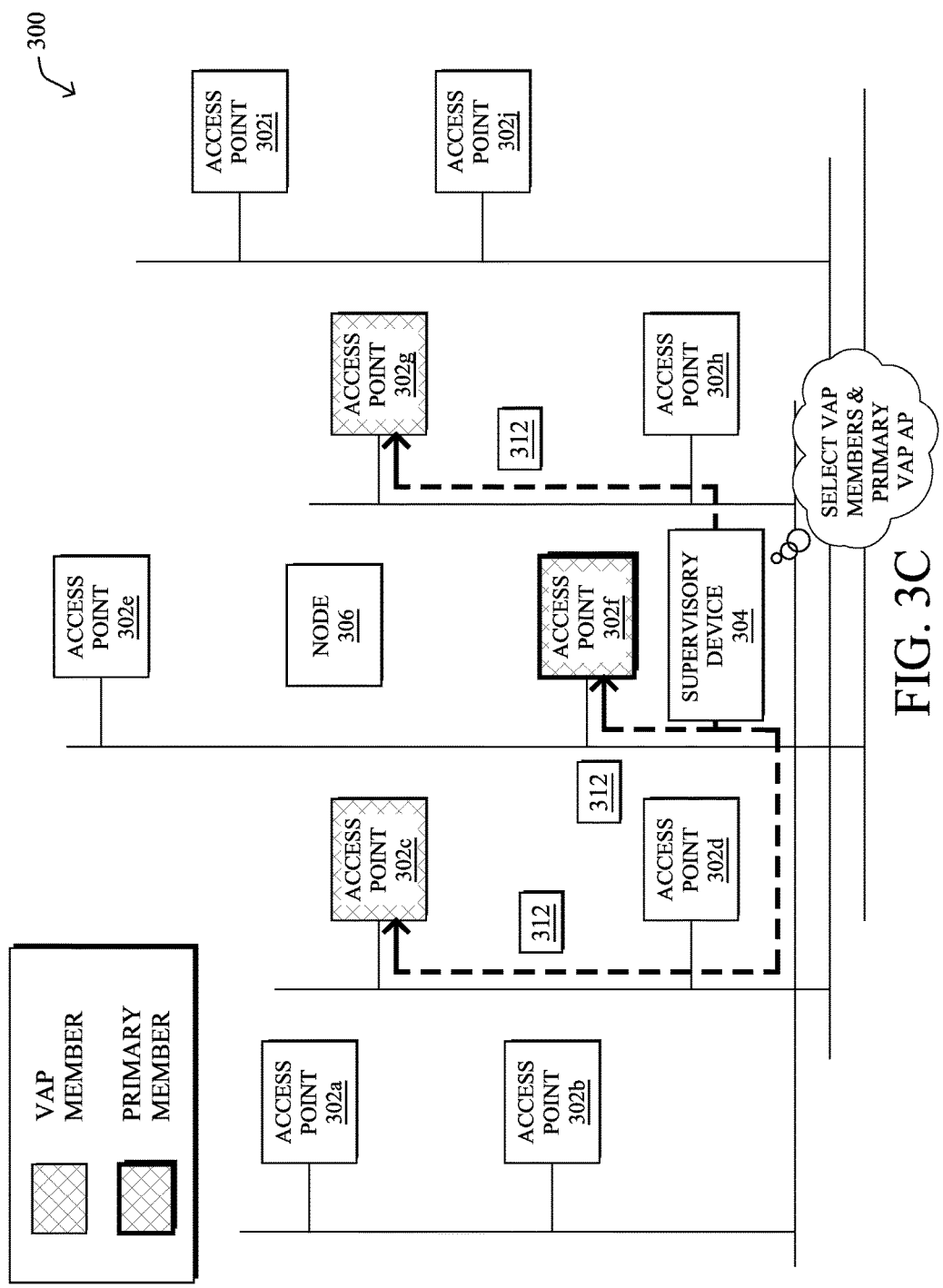

In FIG. 3C, the supervisory device 304 may create a virtual AP (VAP) that is unique to node 306. In general, the VAP may be mapped to any number of APs 306 selected by supervisory device 304 based in part on the data 310 regarding the availability request 308 received by the various APs 302. In other words, the VAP may be a logical construct that is distributed over multiple APs 302. For example, even though APs 302c, 302e, 302f, and 302g received association request 308 from node 306, supervisory device 306 may determine that the set of APs 302 in the VAP mapping for node 306 should only include APs 302c, 302f, and 302g, based on the quality of the received request 308 (e.g., AP 302e may be excluded from the VAP based on the poor quality of the received broadcast signal).

In addition to selecting the VAP member APs 302, supervisory device 304 may also designate one of the selected APs 302 as the primary AP 302 for the VAP. For example, based on data 310 regarding the availability request 308 sent by node 306, supervisory device 304 may determine that AP 302f has the best signal quality and should be the primary AP within the VAP for node 306. In turn, as shown in FIG. 3C, supervisory device 304 may send instructions 312 to the selected APs 302c, 302f, and 302g that include information regarding the VAP. For example, instructions 312 may instruct the selected APs 302c, 302f, and 302g to belong to the VAP for node 306, as identified initially by MAC address of node 306 and, as soon as it is available, by security token, and/or other cryptographic methods.

To implement the VAP in the network, supervisory device 304 may employ a VAP protocol, in order to exchange configuration and data packets with the APs 302. This protocol may be seen as an extension to existing protocols, such as Lightweight Access Point Protocol (LWAPP) and Control and Provisioning of Wireless Access Points (CAPWAP), or may be specified as a new protocol. For example, the exchanges of data 310 and instructions 312 may use this VAP protocol.

Figure 3D:
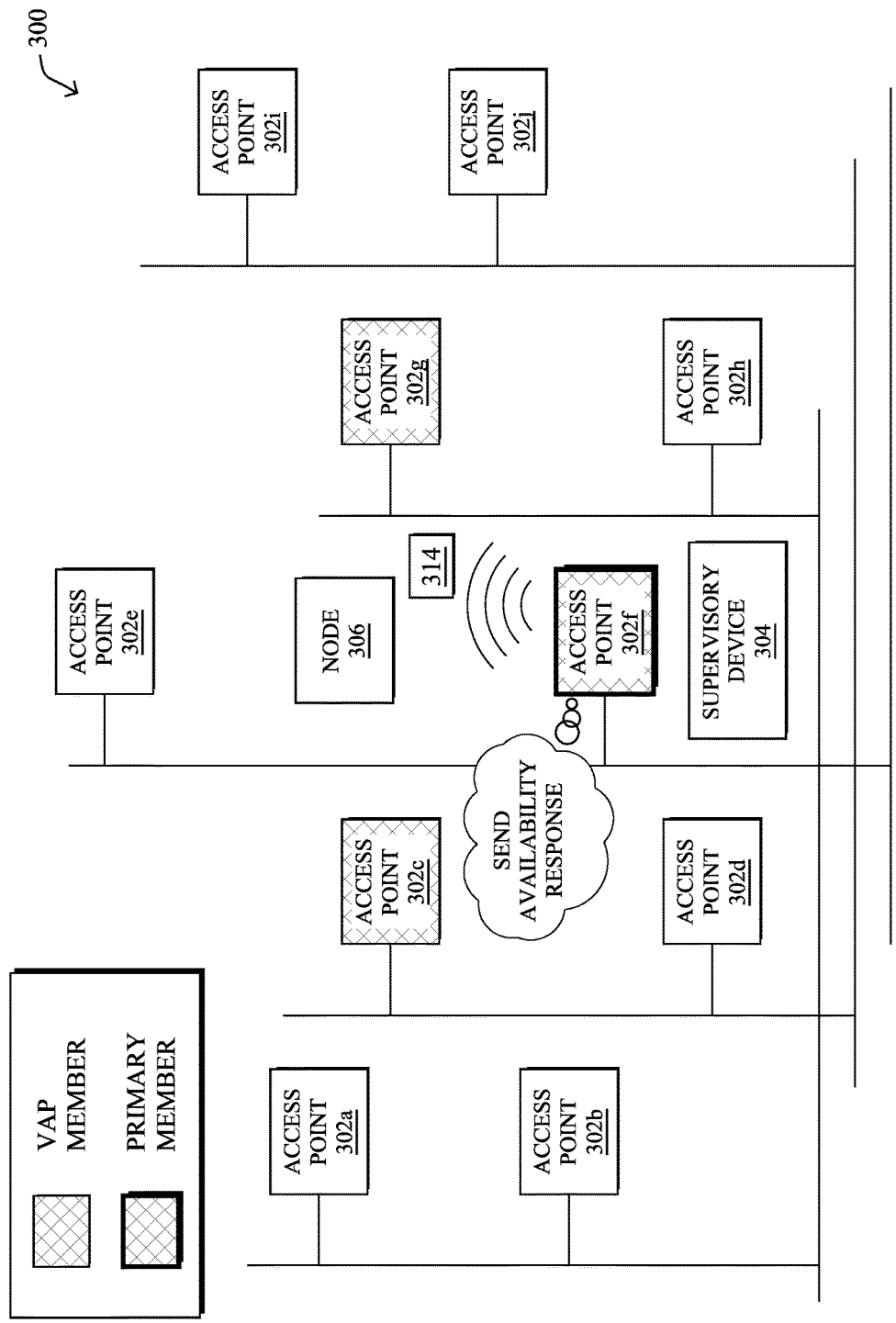

As shown in FIG. 3D, once the VAP has been generated and APs 302c, 302f, and 302g selected for mapping to the VAP, the primary AP 302f may send a network availability response 314 back to node 306. For example, response 314 may be a unicast probe response that has the same information as a beacon frame. In various embodiments, response 314 sent by primary AP 302f to node 306 may also include a unique network identifier associated with the VAP. For example, response 314 may include an SSID or PAN-ID generated by supervisory device 304 specifically for use with the VAP. In turn, node 306 may use the received response 314 to associate with the network, as it would under normal conditions. From the standpoint of node 306, it is associating with the network normally via AP 302f and may remain unaware of the existence of its associated VAP.

Figure 4A:
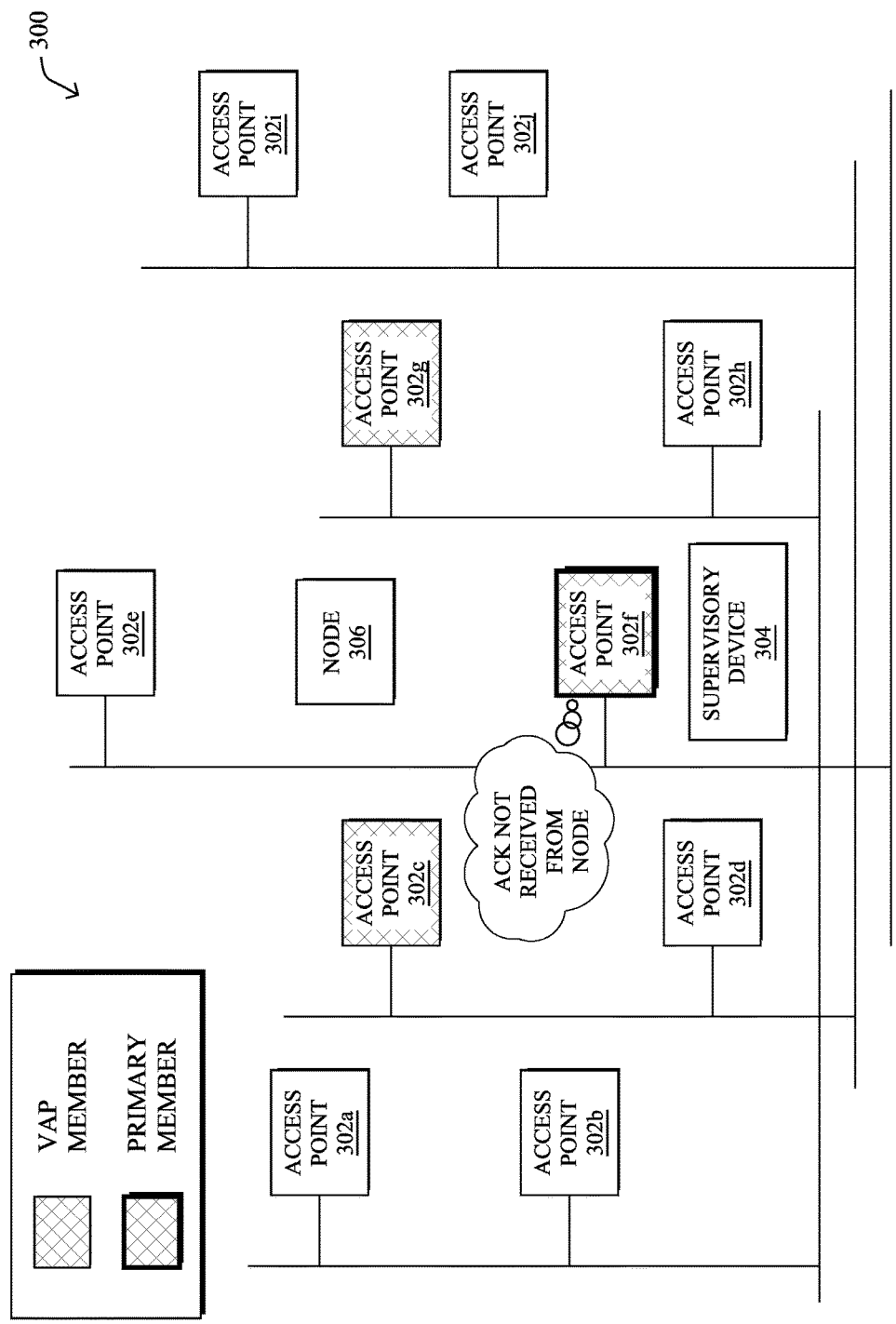
FIGS. 4A-4B illustrate an example of the operation of a VAP.
Figure 4B:
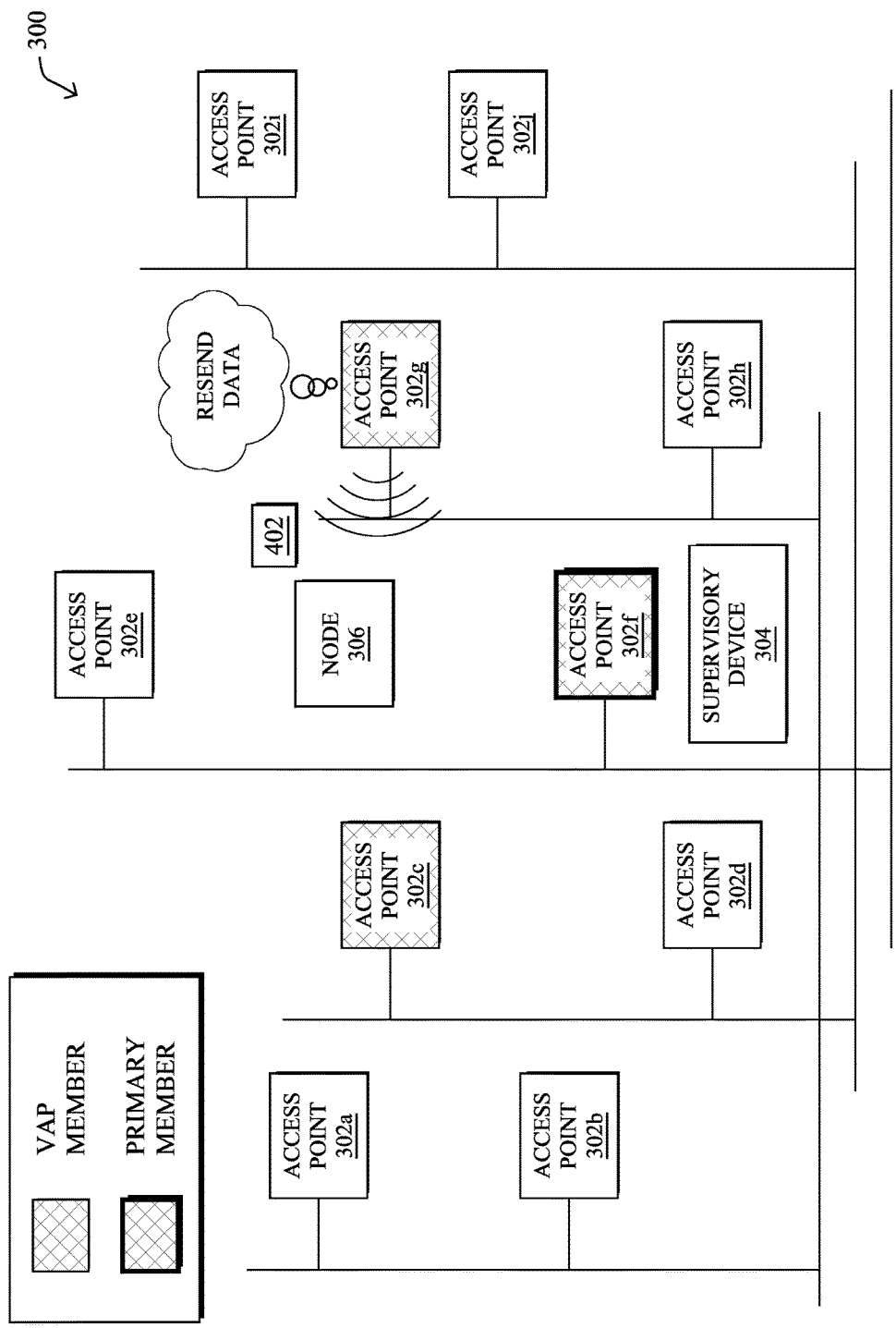

FIGS. 4A-4B illustrate an example of the operation of a VAP after formation, according to various embodiments. Continuing the examples of FIGS. 3A-3D, when forming the VAP for node 306, supervisory device 304 may also build an ordered list of the other APs 302 in the VAP mapping and conveyed to the selected APs 302 via instructions 312. In general, the ordered list may be used to add special diversity and improve the chances of a successful reception versus a retry from a given AP 302 that has already failed once. For example, as shown in FIG. 4A, assume that primary AP 302f has sent a message to node 306, but that message has not been acknowledged by node 306. Under normal circumstances, AP 302f would then attempt to retry sending the message again to node 306. However, according to various embodiments, as shown in FIG. 4B, AP 306g may instead resend the message 402 to node 306. Because the resend is sent from a different AP, the added spatial diversity increases the chances that the resent message 402 is received and acknowledged by node 306.

In various embodiments, learning machines may play a key role in the assignment of APs to a VAP and/or in the adjustment of an existing VAP. For example, such a learning machine may be trained to select APs 302 for inclusion in a given VAP based on a location estimation for the corresponding node (e.g., from data 310) and/or the desired optimization for the traffic expected from that type of node. For example, the location of node 306 may be derived from a Time Difference of Arrival value (TDOA or DTOA) and/or using triangulation between different APs 302.

Such a traffic optimization may be based on a history of traffic for the type of node, in some cases. As would be appreciated, the type of approach taken by the learning machine(s) may also vary with the specific objective function for the traffic and node type. For example, assume that node 306 is a particular type of telepresence device and that video traffic from similar devices has required a certain degree of network performance (e.g., in terms of drops, delay, jitter, etc.). In such a case, the learning machine may use its model for this node type, as well as any necessary metrics from the APs 302 in the network, to select an appropriate VAP mapping to satisfy the objective function. Note that the objective function will also dramatically influence the set of metrics to be gathered from APs after the scanning phase but also during the lifetime of a VAP. Indeed, according to the objective function, the set of required features, in machine learning terms, may vary, and the frequency of AP selection for the VAP will also vary.

Figure 5A:
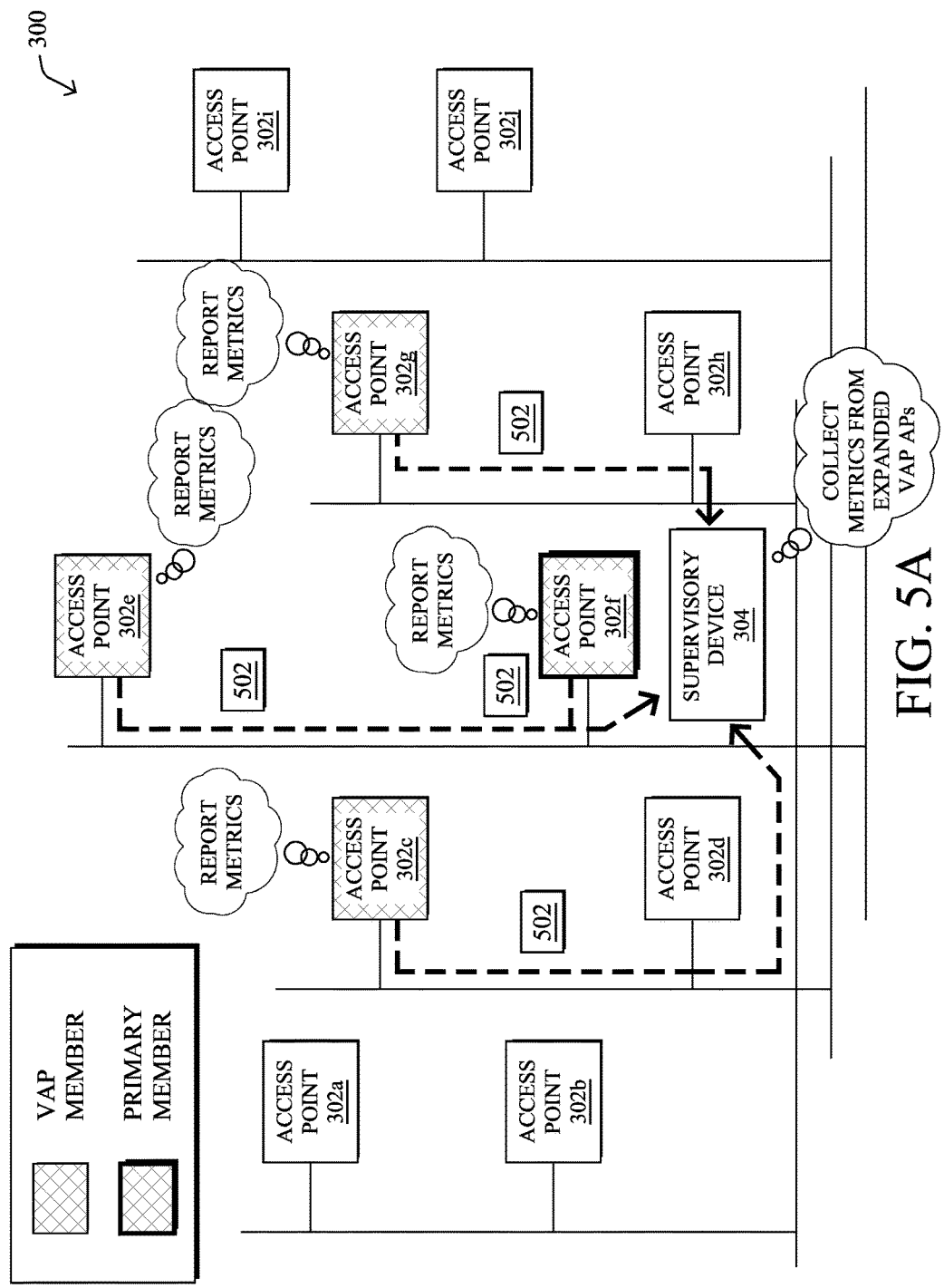
FIGS. 5A-5C illustrate an example of adjusting a VAP mapping.
Figure 5B:
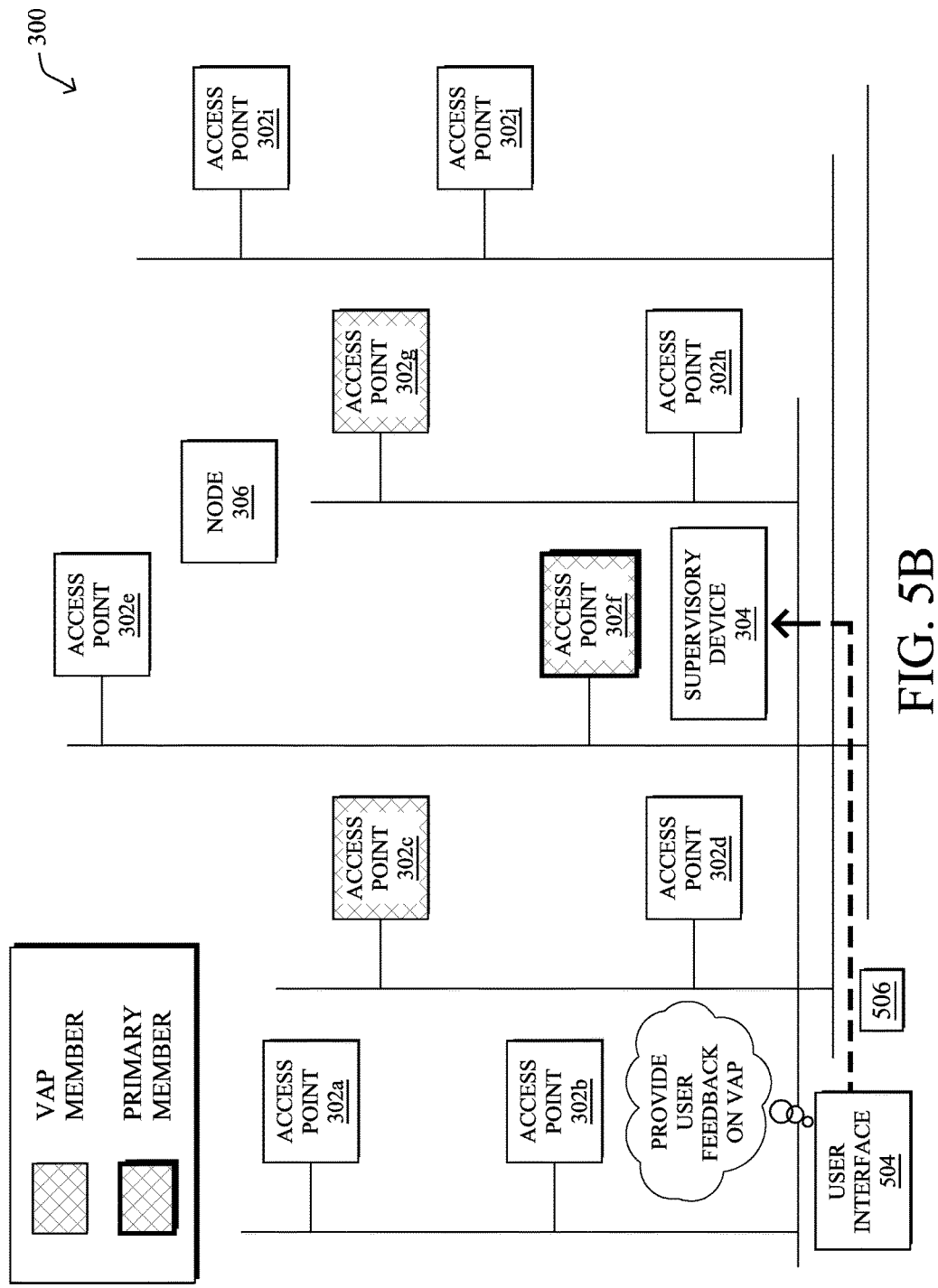
Figure 5C:
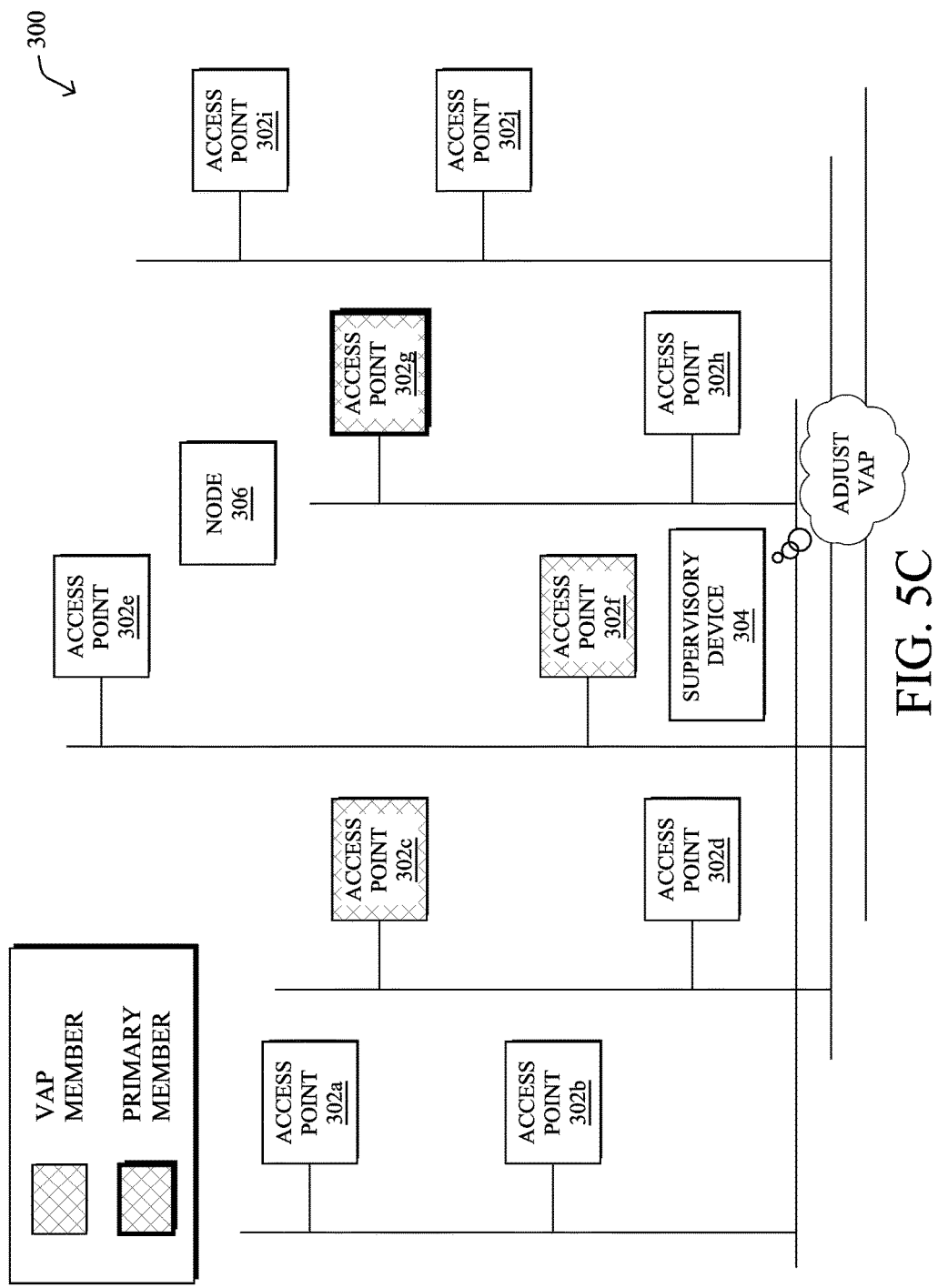

FIGS. 5A-5C illustrate an example of adjusting a VAP mapping, according to various embodiments. Even after formation of a VAP for a given node, supervisory device 304 may continue to monitor and adjust the VAP, in order to ensure that the objective function of the corresponding machine learning model for node 306 continues to be met. To do so, the following message types are introduced herein as part of the VAP protocol:

1.) VAP commands sent by the learning machine to APs 302, to gather metrics of interest (e.g., network characteristics/statistics), report the VAP group membership, etc.

2.) VAP metrics sent by the responding APs 302 to the learning machine and used by the objective function to compute the VAP membership (e.g., based on signal/noise ratio, signal strength, etc.).

3.) VAP stats reports sent by APs 302 to the learning machine and used to evaluate the VAP efficiency. Such stats reports may be used to gather statistical data used by the learning machine to determine the "efficiency" of the VAP group, which can be used by the learning machine to consistently adjust the VAP according to an objective function.

4.) Learning machine stats sent by learning machine to a user interface, to report objective function efficiency results.

In various embodiments, for purposes of collecting network metrics/characteristics and VAP stats from APs 302, supervisory device 304 may occasionally increase or otherwise adjust the APs in the VAP mapping. For example, as shown in FIG. 5A, supervisory device 304 may include AP 302e in the VAP mapping for purposes of data collection after formation of the VAP (e.g., via an instruction 312, even though AP 302e was not included in the original VAP mapping. This allows AP 302e to collect and report information that would not otherwise be possible using the original APs of the VAP. For example, by changing the set of APs, the learning machine can change the TDOA listeners and optimize the distance estimation, e.g., by adding APs while doing a measure, or triangulating between different sets of APs. Such collected information 502 may be reported to supervisory device 304, either on a push or pull basis. After the data collection, supervisory device 304 may opt to revert the VAP mapping back to its previous membership or make further adjustments to the AP memberships, accordingly.

As shown in FIG. 5B, supervisory device 304 may also convey data regarding the performance of the VAP (e.g., the objective function, etc.) to a user interface 504 for review by a user. In some embodiments, the learning machine may also use reinforcement learning to adjust its model for node 306 and make changes to the VAP mapping, accordingly. In such a case, the user of interface 504 (e.g., an admin device, etc.) may provide feedback 506 to the learning machine about the VAP efficiency, which is then used by the LM to adjust the strategy adopted to compute the VAP mapping.

Based on the captured network characteristics from the APs, the performance statistics for the VAP itself, and/or user feedback, the machine learning process may adjust the VAP by changing the APs in the VAP mapping. For example, as shown in FIG. 5C, assume that node 506 has move to a new physical location and is now in closer proximity to APs 302e and 302g. In such a case, supervisory device 504 may select a new set of APs 302 for the VAP of node 306 and send out corresponding instructions to the APs. Notably, as shown, supervisory device 304 may select a new set of APs for the VAP of node 306 that includes APs 302e, 302f, and 302g, with 302g now designated as the primary AP.

Thus, the generated VAP may add spatial diversity to any CSMA/CA LLN, in a manner somewhat akin to that of the LoRa model. However, in contrast to the techniques herein, LoRa uses different MAC operations and does not support the faster speeds of the components (e.g., PHY) used in today's IoT network devices. Additionally, LoRa does not support the association process, the use of identities (e.g., PAN-ID or SSID), and the automatic repeat request (ARQ) process for acknowledgement and retry, which are supported using the techniques herein. Further, LoRa does not support multicast communications, either.

Data Traffic Management in a VAP

Fluctuations in the radio quality and concurrent accesses to the medium impact the observed quality by forcing the AP to degrade the transmission rate or wait to access the medium. From the user perspective, the quality of the link varies widely within short windows of time. In short, the experienced quality lacks determinism, which as mentioned above, would enable new IoT use cases for in CSMA/CA operations (e.g., LP-WiFi, 802.15.4, DECT-ULE, and BTLE).

It is also important to find the right balance between speed, which limits the range, and the number of APs in the VAP that can communicate with the device, which improves diversity thus reliability. A higher speed frees the medium more rapidly, but may entail retries and thus additional jitter. This balance is difficult to find for even a fully functional Wi-Fi STA since it lacks a perspective on what other devices need and how his use of the medium impacts the others. This is even more difficult for constrained IoT devices that lack processing power.

The VAP techniques above optimize the chances of reception and successful acknowledgement of frames coming from an IoT device for those technologies, and add spatial diversity between the device and the controller via different physical APs. The following techniques below build on the above VAP architecture to leverage its capabilities and to impart a degree of determinism to the data traffic.

The mechanisms herein optimize the number of APs in the VAP mapping that can be reached by, or reach to, a destination node for any given frame, such as by tuning the transmission speed/code and thus the range based on flow type. The mechanisms herein also eliminate duplicates on the way from the device, and enable spatial diversity towards the device.

Said differently, according to the techniques herein, learning machines (LMs) at the supervisory device/controller may select a number of access points (APs) (e.g., based on objective function) in a VAP that are to receive the data packets from a node by tuning the transmission speeds of the VAP APs and/or the set of VAP APs that are to receive data from the node and forward to the supervisory device. The supervisory device may then eliminate any duplicates received and reported by multiple APs and select the AP that will acknowledge the received data to the node. In further aspects, such as when data is to be sent to the node from the VAP, the supervisory device may multicast the data to more than one AP in the VAP and triggers them in a round robin, or according to an ordering computed by the LM, to transmit the data until it is successfully acknowledged by the node. Objective functions in the LM may also optimize the transmission speeds used in the VAP based on the needs of the traffic. For example, the supervisory device may increase speeds for media, potentially decreasing the number of APs that will get the data from the node, or lower the data rate for interactive traffic, thereby balancing throughput for reliability and latency (i.e., lower speeds typically lead to more copies received).

Notably, current techniques, such as LoRa, do not exploit a return channel and does not have a solution to improve the diversity on the way back to the device (which is a critical issue in the IoT for many applications). That is, current techniques only select one GW to transmit back. In other words, LoRa has the concept of GWs that each copy a same packet to the NS, but for the return path, all LoRa does is select a probable best GW to send the data. There is no concept of retry, and no use of diversity to improve the chances of reception. In order to adapt that model to other MAC technologies—that are capable of ARQ—, the techniques herein enable multiple APs to send retries of the failed transmissions.

Specifically, a supervisory device in a network forms a virtual access point (VAP) for a node in the network whereby a plurality of access points (APs) in the network are mapped to the VAP as part of a VAP mapping. The node treats the APs in the VAP mapping as a single AP for purposes of communicating with the network. The supervisory device determines a data traffic management strategy for the node based on traffic associated with the node. The supervisory device instructs the APs in the VAP mapping to implement the data traffic management strategy for the node.

Operationally, the techniques herein apply to an environment such as a VAP-enabled CSMA/CA wireless networks (described above), as well as any other type of computer network that can implement the techniques herein. The embodiments herein generally consider the case of a VAP-enabled LLN for describing one particular embodiment, though other embodiments may be understood by those skilled in the art. Also, as done above, the description below uses the Low Power Wi-Fi parlance of APs, which is used herein in the general sense to refer any form of transceiver in a network that communicates with a node and is not to limit the teachings herein to strictly Wi-Fi networks.

What the techniques herein achieve is the optimization of the data transmission for a certain objective, which can be throughput for traditional video cameras, but could also be fixed latency, for instance for industrial IoT flows. The techniques herein adapt the transmission speed so as to minimize the negative influence that flows from different devices may have on one another, based on type of traffic and its criticality.

As would be appreciated, the goal for a video frame is not that many APs get the packet, but that the nearest one does with minimum channel occupancy. If that works for most packets, then the impact of that particular transmitter in the overall bandwidth is minimized. However, when transmission failures occur, the footprint in the channel due to the retries for that transmission impacts not only this device but all the others fighting for the bandwidth. This is detrimental to latency for all nodes connected to the network.

In contrast, a typical control frame is much smaller and its transmission speed does not really impact the other nodes that share the channel. Thus, in this case, the optimization may entail optimizing the VAP to maximize the number of APs that will get the frame, so as to increase diversity and reduce loss and jitter.

Said differently, based on the type of traffic, the VAP operations in the network can be tuned to optimize for latency, drops, jitter, and other traffic characteristics. Devices are instructed to reduce speed if the traffic appears to be interactive, which can be recognized by fast periodical patterns (e.g., voice, control loops), or if the aggregate throughput is small versus the overall network bandwidth or backhaul upstream.

Regarding optimizing traffic from the client, for data coming from the node, the techniques herein leverage the fact that by lowering the speed, the data may reach farther and more APs in the VAP may be able to get it (e.g., by decreasing the frame speed). This creates an additional diversity that increases the chances of reception. In turn, this avoids retries and improves the latency for this transmission as well as all concurrent transmissions that are fighting for the medium.

When optimizing for latency, multiple APs in the VAP may get a same copy, and they sequence the received frames before they send them to the supervisory device/controller, in some embodiments. The sequence number provides an idea of an order for an AP and a node. Based on that order, the supervisory device/controller compares what it gets from multiple APs and removes the duplicates.

Figure 9:
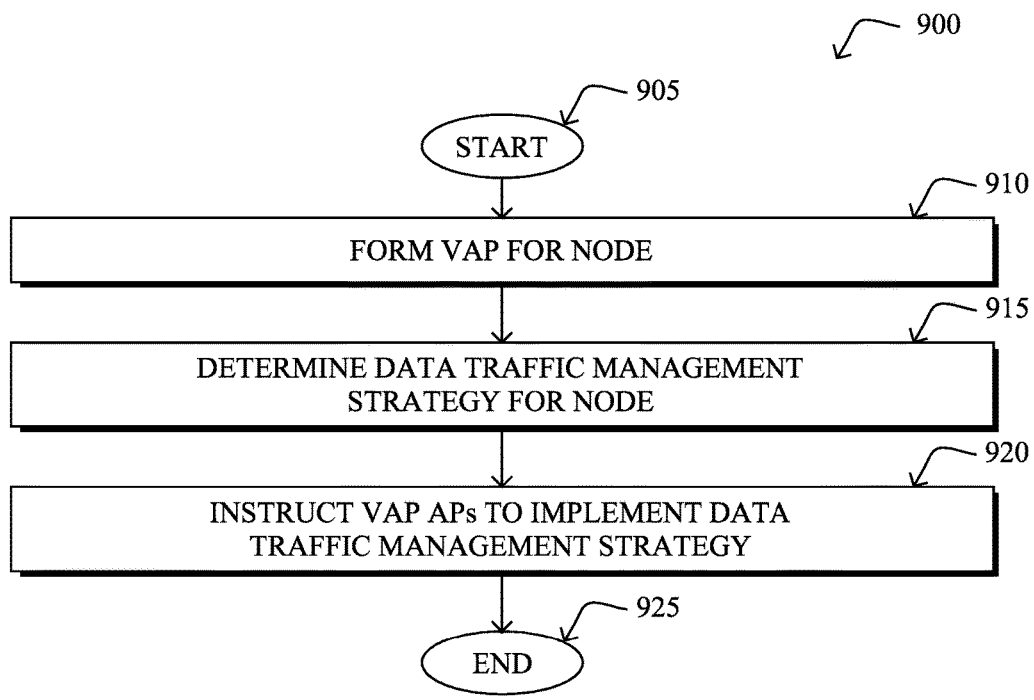
FIG. 9 illustrates an example simplified procedure for managing data traffic in a VAP.

Acknowledgements may be sent by the primary AP only, as illustrated in FIG. 9. However, one illustrative embodiment applies to acks the same logic as for frames going to the STA, as described below.

Note that the techniques herein define a message received by the LM (as specified above) from an AP that provides a stats report on which packets have been received by which AP with the corresponding success rate, timing, etc. Such reports are essential feed-back used by the LM to constantly optimize the VAP group.

Figure 6A:
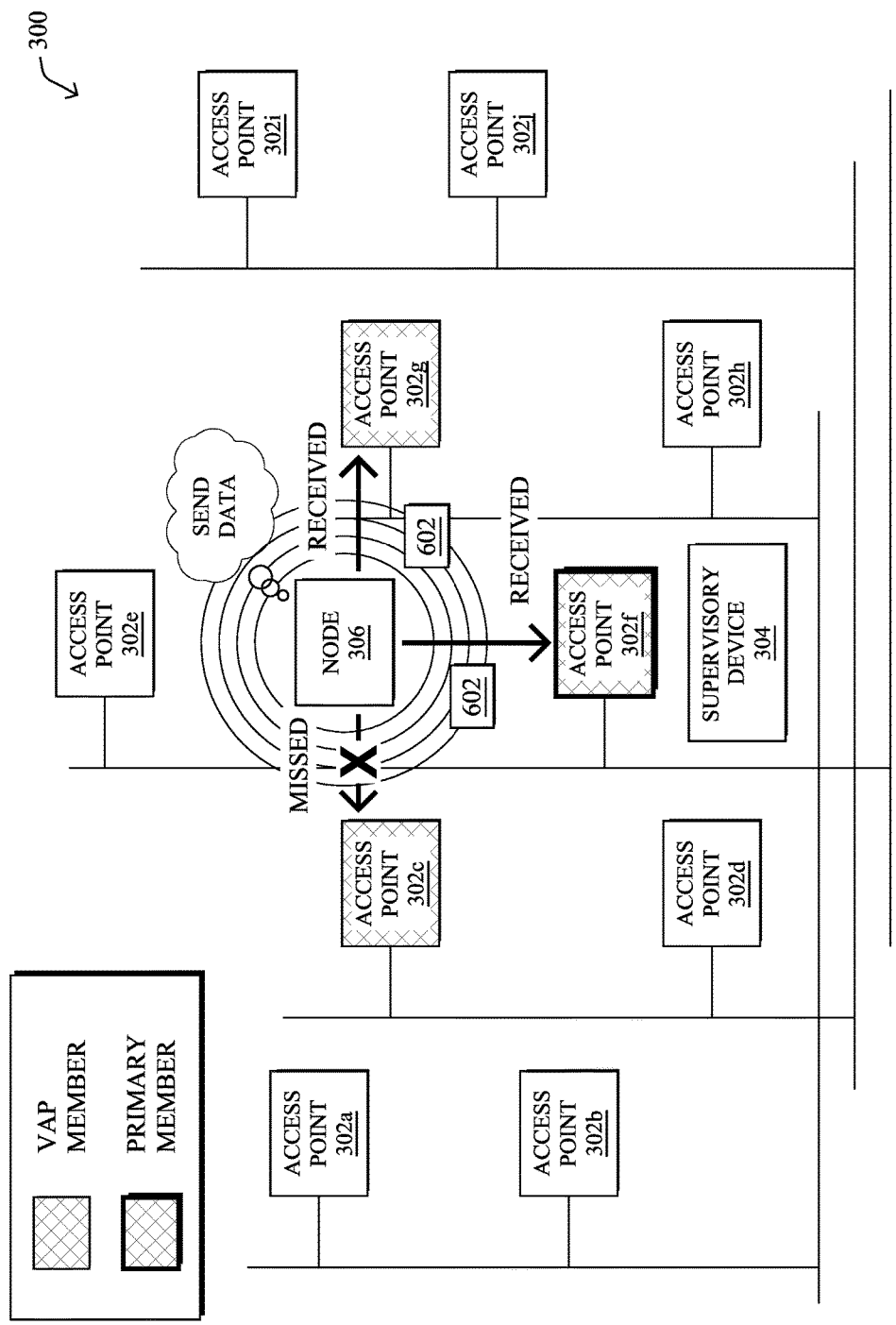
FIGS. 6A-6C illustrate an example of a VAP receiving data from a node.
Figure 6B:
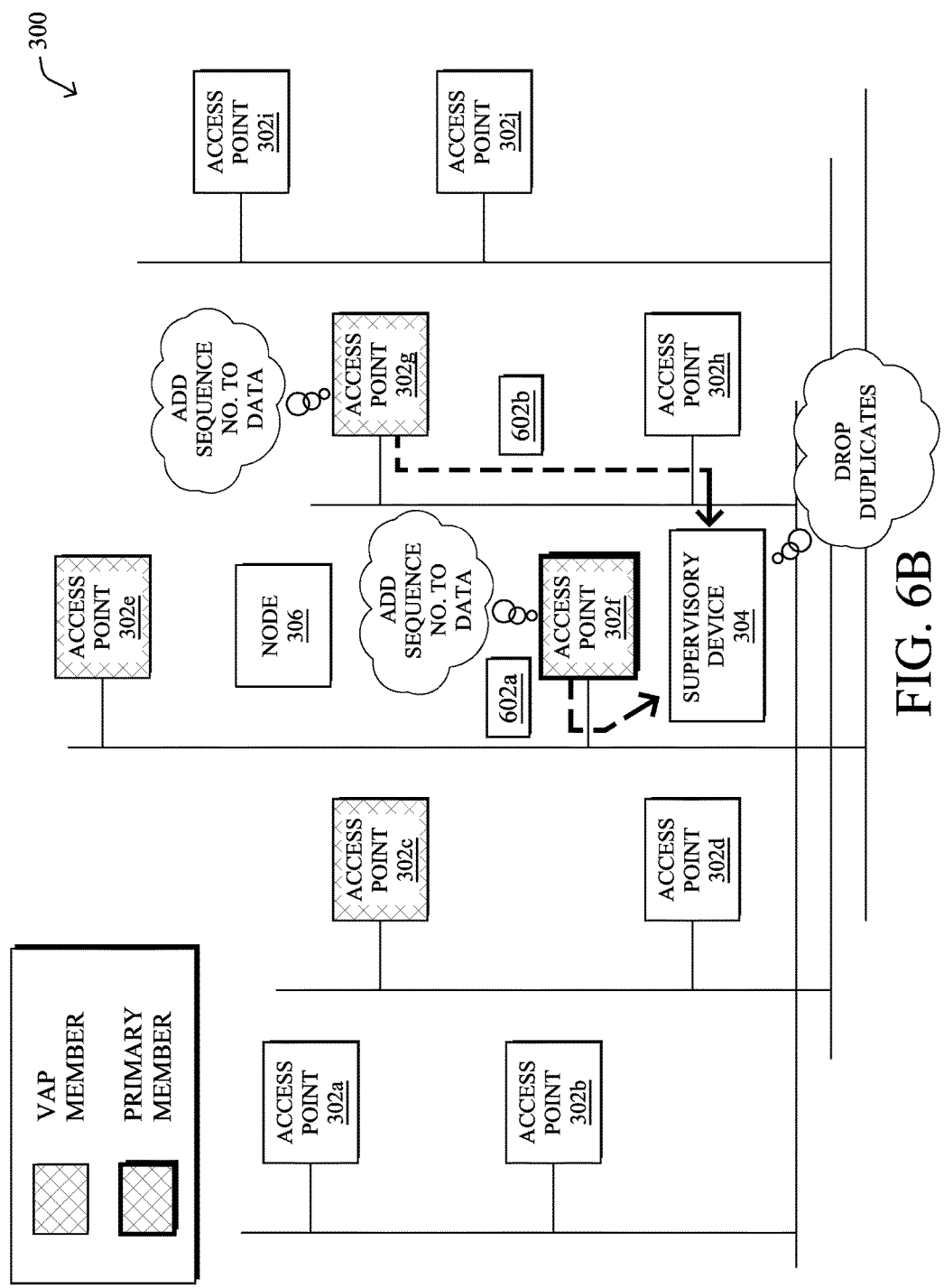
Figure 6C:
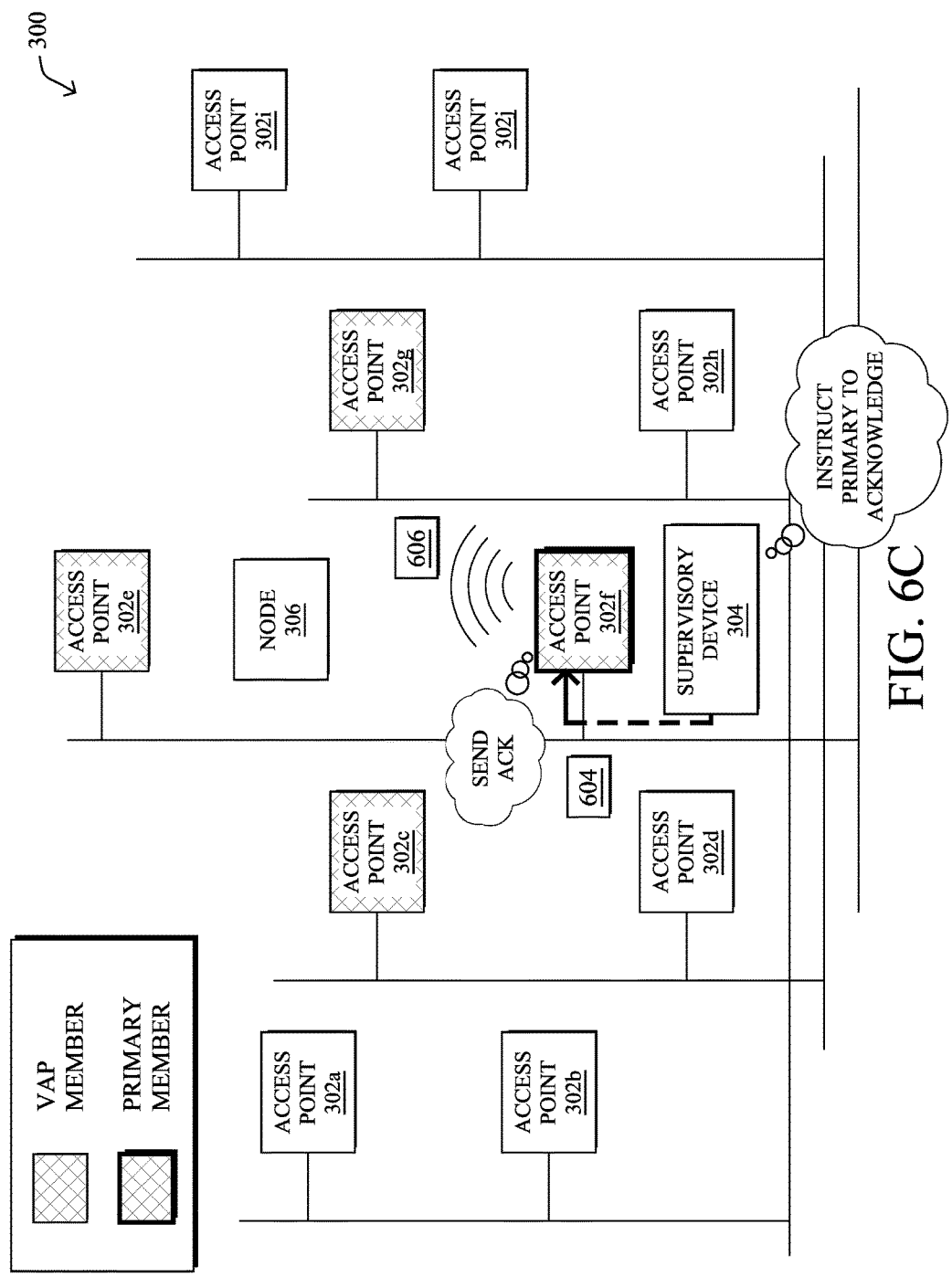

FIGS. 6A-6C illustrate an example of a VAP receiving data from a node, according to various embodiments. Continuing the previous examples above, assume that supervisory device has formed a VAP for node 306 that has APs 302*c*, 302*f*, and 302*g*, with AP 302*f* designated as the primary AP. As shown in FIG. 6A, node 306 may transmit data 602 towards the formed VAP. As noted, from the perspective of node 306, it may believe that it is communicating with a single AP (e.g., the VAP), when it is, in fact, potentially communicating with multiple APs mapped to the VAP. In other words, APs 302*c*, 302*f*, and 302*g* mapped to the VAP of node 306 may listen for communications from node 306.

For purposes of illustration, assume that not all of the APs mapped to the VAP for node 306 receive the transmitted data 602. For example, AP 302*c* may experience a reception miss, for any number of reasons, and not receive the transmitted data 602 sent by node 306. Primary AP 320*f* and AP 302*g* may, however, successfully receive the transmission.

As shown in FIG. 6B, any of the APs in the VAP that receive the transmitted data 602 from node 306 (e.g., APs 320*f* and 302*g*) may first add a sequence number to the received data 602. In turn, each of the receiving APs may send the received data 602, with their respective sequence numbers, to supervisory device 304. For example, AP 302*f* may send data 602*a*, having the sequence number assigned by AP 302*f*, to supervisory device 304. Likewise, AP 302*g* may send data 602*b*, having the sequence number assigned by AP 302*g*, to supervisory device 304.

When supervisory device 304 receives duplicates of a transmission sent by node 306, it may drop/eliminate the duplicates using the sequence numbers added by the receiving APs. For example, supervisory device 304 may drop the duplicate data 602*b* received from AP 302*g*, opting in favor of keeping the data 602*a* received from AP 302*f*. In turn, supervisory device 304 may send the retained data on towards its destination, either in the local network or externally. In other words, supervisory device 304 may leverage the fact that the packets from node 306 are received in the same order by the APs 302 in the VAP for node 306, to identify duplicates.

By way of a more specific example, assume that AP 302f receives a sequence of packets from node 306 and labels the packets '5,' '6,' and '7,' before sending the packets on to supervisory device 306. Similarly, assume that AP 302g received packets from node 306 and labels the packets '9' and '10' using its own local sequencing, before sending them on to supervisory device 306. In turn, supervisory device 304 may perform a bitwise comparison of the packets from the two APs 302f and 302g that indicates that the frame labeled '5' by AP 302f is the same as the frame labeled '9' by AP 302g and that the frame labeled '7' by AP 302f is the same as the frame labeled '10' by AP 302g. In such a case, supervisory device may determine that AP 302g missed the frame labeled '6' by AP 302f.

In further embodiments, the source node 306 may instead sequence the packets. For example, source node 306 may sequence the packets at Layer 2 for security reasons (e.g., as a nonce to ensure that all frames are different before applying cryptography). In this case, APs 302 may use these sequence numbers instead of applying AP-local sequencing in the packets from the APs 302 to supervisory device 306 and eliminating the need for any bitwise comparison by supervisory device 304. In further embodiments, if the APs 302 are synchronized within a very tight timeframe (e.g., sub-microseconds, etc.), APs 302 could use timestamps to label the received packets from node 306, instead, thereby facilitating the comparisons by supervisory device 304.

Once supervisory device 304 has determined that at least one of APs 302c, 302f, and 302g in the VAP mapping for node 306 has received the data 602 transmitted by node 306, it may select and instruct one of these APs to acknowledge the receipt to node 306. Again, as noted, only a single one of the APs may actually send an acknowledgement (ACK) back to node 306, since it believes that it is communicating with only a single AP. In various embodiments, supervisory device 304 may select the acknowledging AP based on factors such as the APs that received the transmission 602 from node 306, the characteristics of the received transmissions (e.g., the respective signal strengths of the receptions, etc.), the current state of the VAP or network in general, or the like. For example, since AP 302c did not receive the transmitted data 602 from node 306 in the first place, supervisory device 304 may eliminate it as a possible acknowledger of the transmission.

After selecting an acknowledging AP from the VAP mapping, supervisory device 304 may signal the selected AP to send an ACK back to the node. For example, if supervisory device 304 selects primary AP 302f in the VAP to acknowledge transmitted data 602, it may send an instruction to 604. In response, AP 302f may send ACK 606 to node 306. Typically, the selected acknowledger will be the primary AP for the VAP, but this is not always the case (e.g., if the primary AP did not receive the transmission from the node, etc.).

Regarding optimizing traffic to the client node, in one embodiment, all the frames to the node, whether unicast or broadcast, may be multicast by the supervisory device over the VAP to all the APs in the VAP mapping. This allows any of the VAP APs to send the frame on to the node. Whether and when to send the frame over the air may be controlled using a unicast trigger that is separated from the data itself. For example, the supervisory device may send a newly defined, unicast VAP protocol trigger message to the selected AP that is to actually send the data on to the node.

The techniques herein add a mechanism that optimizes the chances that any packet is received by the target node by triggering transmission from multiple APs until successful transmission is acknowledged by the node.

In one illustrative embodiment, the supervisory device/controller triggers the primary AP to send the frame to the node. In turn, all of the VAP APs then listen for an ACK from the node and, if received, pass the ACK on to the supervisory device. If none of the VAP APs receive an acknowledgement, the supervisory device may determine that the next was not received and trigger the next best AP in the VAP mapping to retransmit (e.g., based on a round robin order, LM decision, or other criteria). In yet another embodiment, a sequenced list of APs may be selected by the LM and if the first preferred AP sends the frame that is not ACK'ed, the second preferred AP sends it etc., until successful acknowledgement. Such a list may be updated by the LM according to the VAP stats reported by the APs, such as discussed above with respect to FIGS. 5A-5C.

FIGS. 7A-7E illustrate an example of a VAP sending data to a node, according to various embodiments herein. As shown in FIG. 7A, again assume that supervisory device has formed a VAP for node 306 that has APs 302c, 302f, and 302g, with AP 302f designated as the primary AP. Now, assume that supervisory device 304 receives data 702 (e.g., from another node in the local network or from a remote data source) that is destined for node 306.

In various embodiments, when data is to be transmitted from a VAP to a node, the supervisory device overseeing the VAP may multicast the data to any or all of the APs in the VAP mapping. For example, in FIG. 7A, supervisory device 304 may multicast data 702 to each of APs 302c, 302f, and 302g. However, only the primary AP 302c may transmit the data 702 on towards node 306. In some embodiments, AP 302c may do so based on its designated status as the primary AP in the VAP mapping. In other embodiments, AP 302f may send data 702 towards node 306 only after receiving a signal to do so from supervisory device 304. Such a message may be, for example, a new message in the VAP protocol.

Figure 7A:
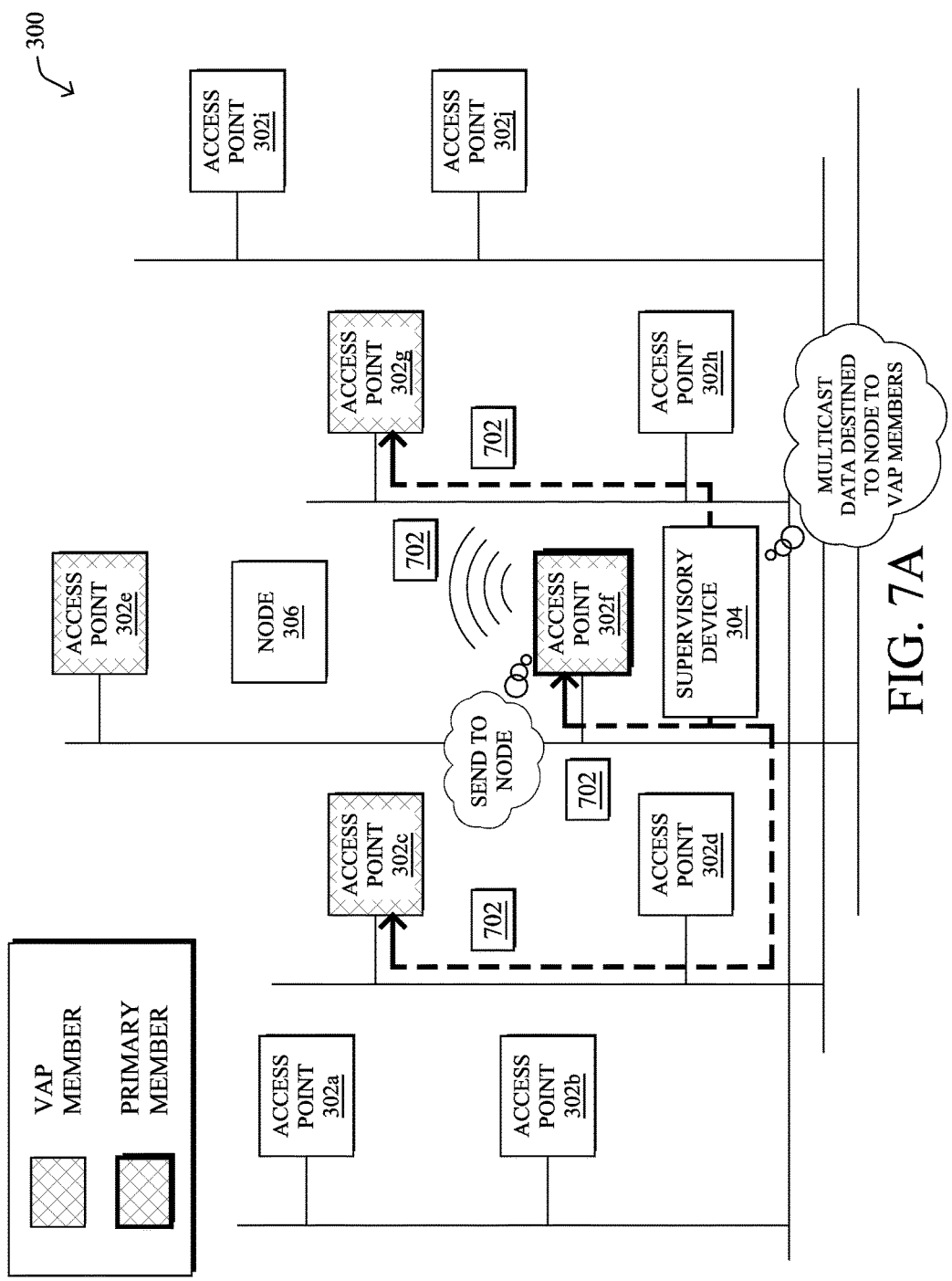
FIGS. 7A-7E illustrate an example of a VAP sending data to a node.
Figure 7B:
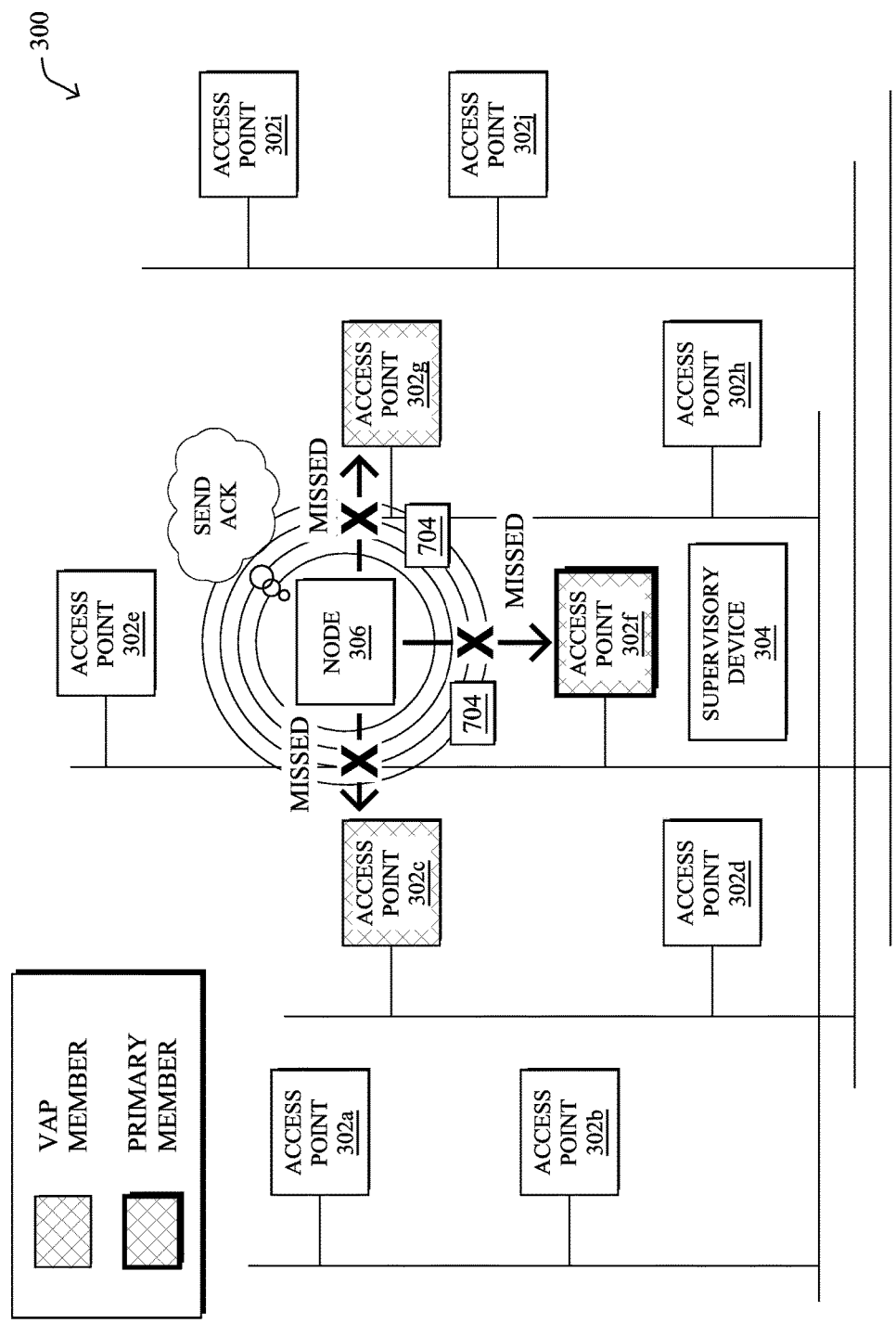

As shown in FIG. 7B, after successful reception of data 702 from AP 302f, node 306 will send an ACK 704 back to AP 302f. In various embodiments, all of the APs in the VAP mapping may listen for such an acknowledgement. In turn, if any of the APs received ACK 704, the AP may send ACK 704 on to supervisory device 304, confirming that node 306 received the transmitted data 702. However, there may be situations in which none of the VAP APs receive an acknowledgement from node 306. For example, as shown, APs 302c, 302f, and 302g may all miss reception of ACK 704 from node 306 for whatever reason. Similarly, if node 306 failed to receive data 702 from AP 302f in the first place, node 306 will not even send ACK 704.

Figure 7C:
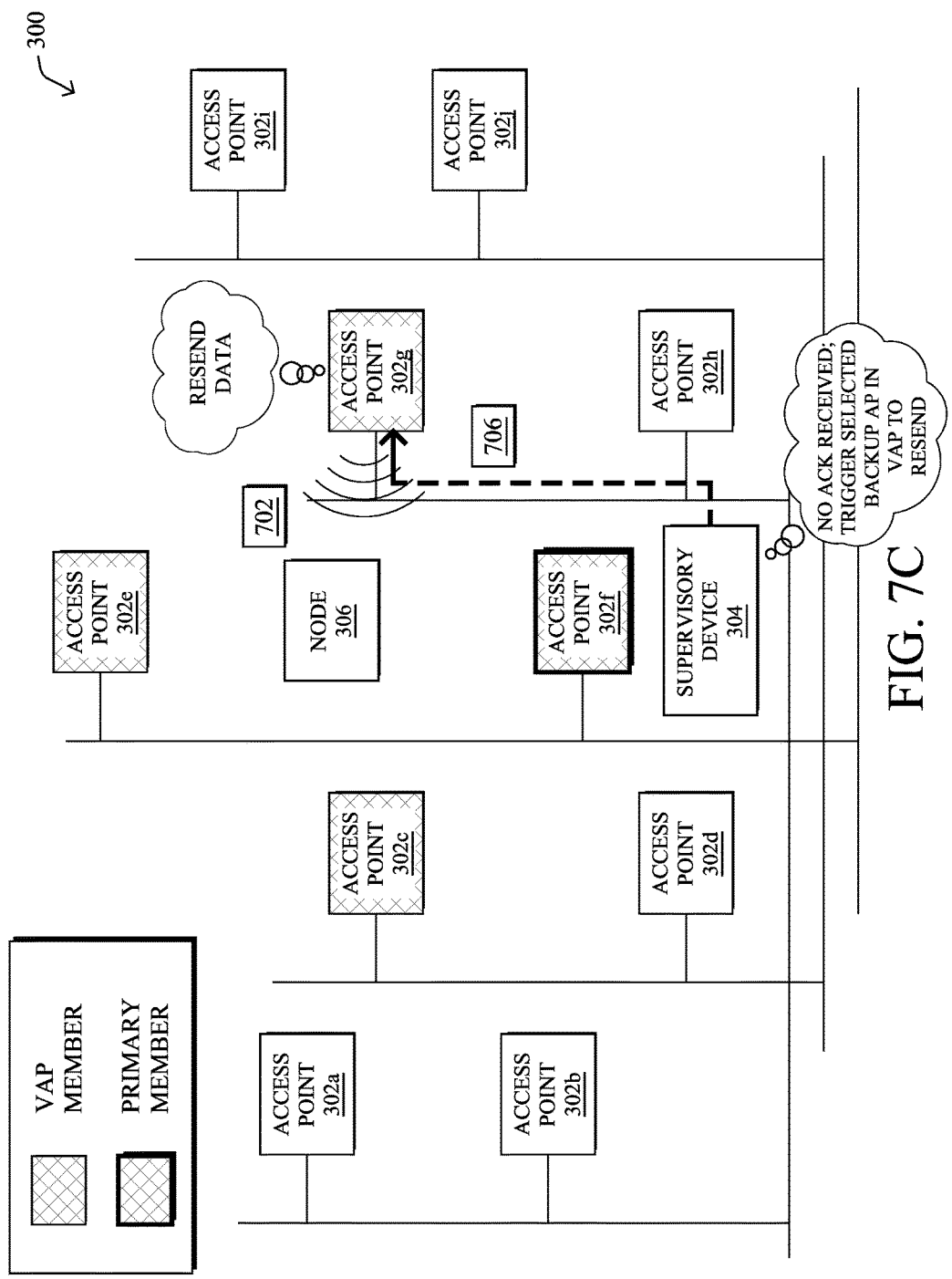

In FIG. 7C, when supervisory device 304 determines that none of the VAP APs received an acknowledgement from node 306, it may select a secondary VAP AP to retransmit data 702 towards node 306. Such a selection may be based, e.g., on the ordering of the VAPs, as determined by the LMs of supervisory device 304. For example, supervisory device 304 may send a trigger instruction 706 to selected backup AP 302g, when the transmission from 302f is not acknowledged by node 306. In turn, AP 302g may retransmit data 702 towards node 306.

Figure 7D:
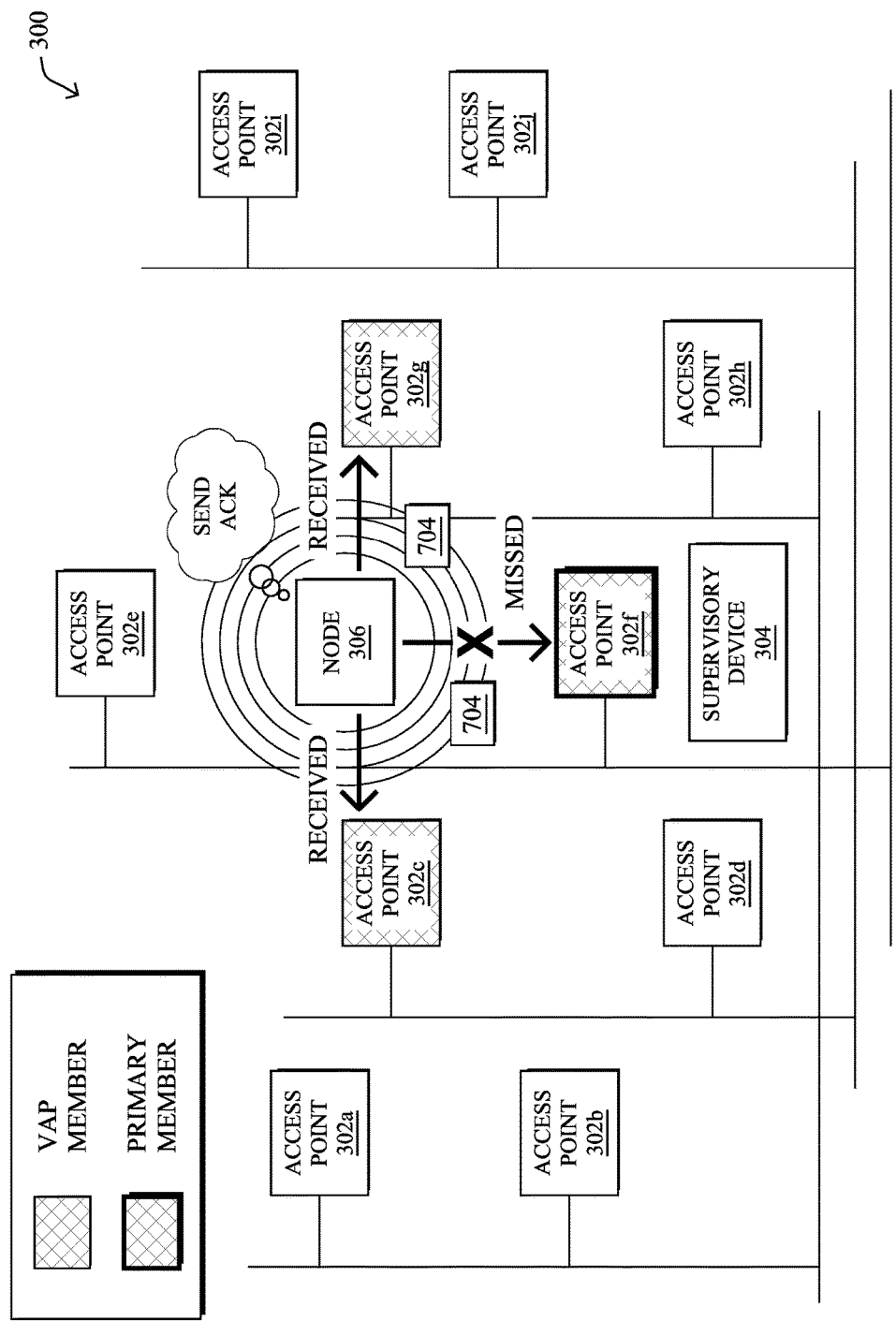

In FIG. 7D, now assume that ACK 704 is received by at least some of the VAP APs, after AP 302g retransmitted data 702 to node 306. For example, as shown, assume that APs 302c and 302g both received ACK 704, but that AP 302f missed the reception for whatever reason.

Figure 7E:
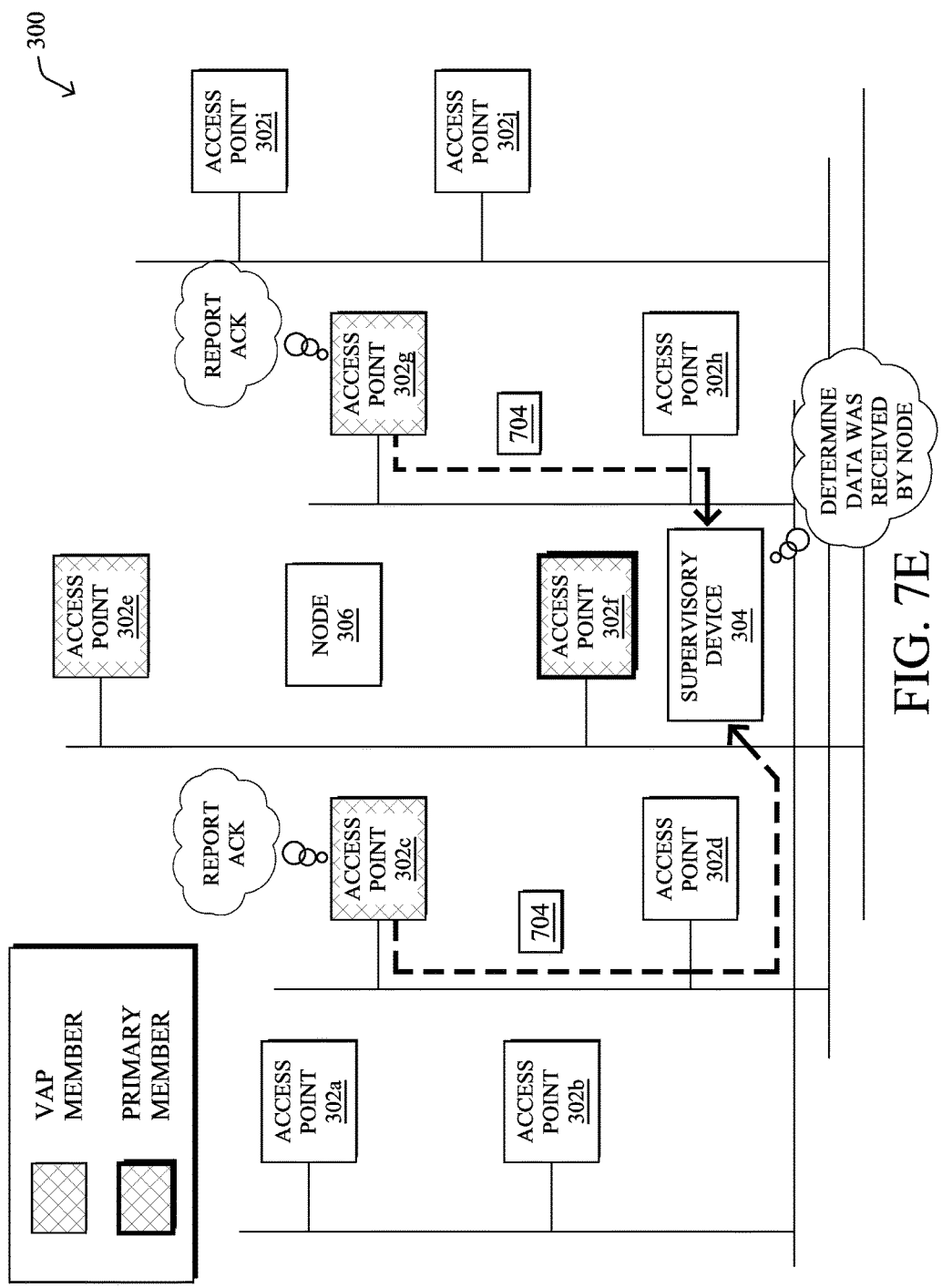

In FIG. 7E, once a VAP AP receives ACK 704 from node 306, it may report the ACK to the supervisory device 304. Based on the received acknowledgement(s) from the APs, supervisory device 306 may then determine that data 702 was successfully received by node 306. However, if none of the APs again failed to receive an acknowledgement from node 306 after AP 302g resent data 702, supervisory device 304 may repeat the above process again, such as by instructing AP 302c to then try retransmitting data 702 to node 306. By adding spatial diversity to the retransmission process, this increases the likelihood of a successful transmission.

Another traffic management approach for a VAP may entail using LMs to adjust the APs in the VAP mapping, as well as their transmission speeds, to optimize one while still preserving the other. Notably, slower transmission speeds typically extend reception range, increasing the potential set of VAP APs, while faster transmission speeds typically reduce the range and potential set. In various embodiments, as discussed, the supervisory device may make such a tradeoff based on the type of traffic associated with the node. For example, media traffic may receive a different set of VAP APs and/or rates than that of interactive traffic.

Figure 8:
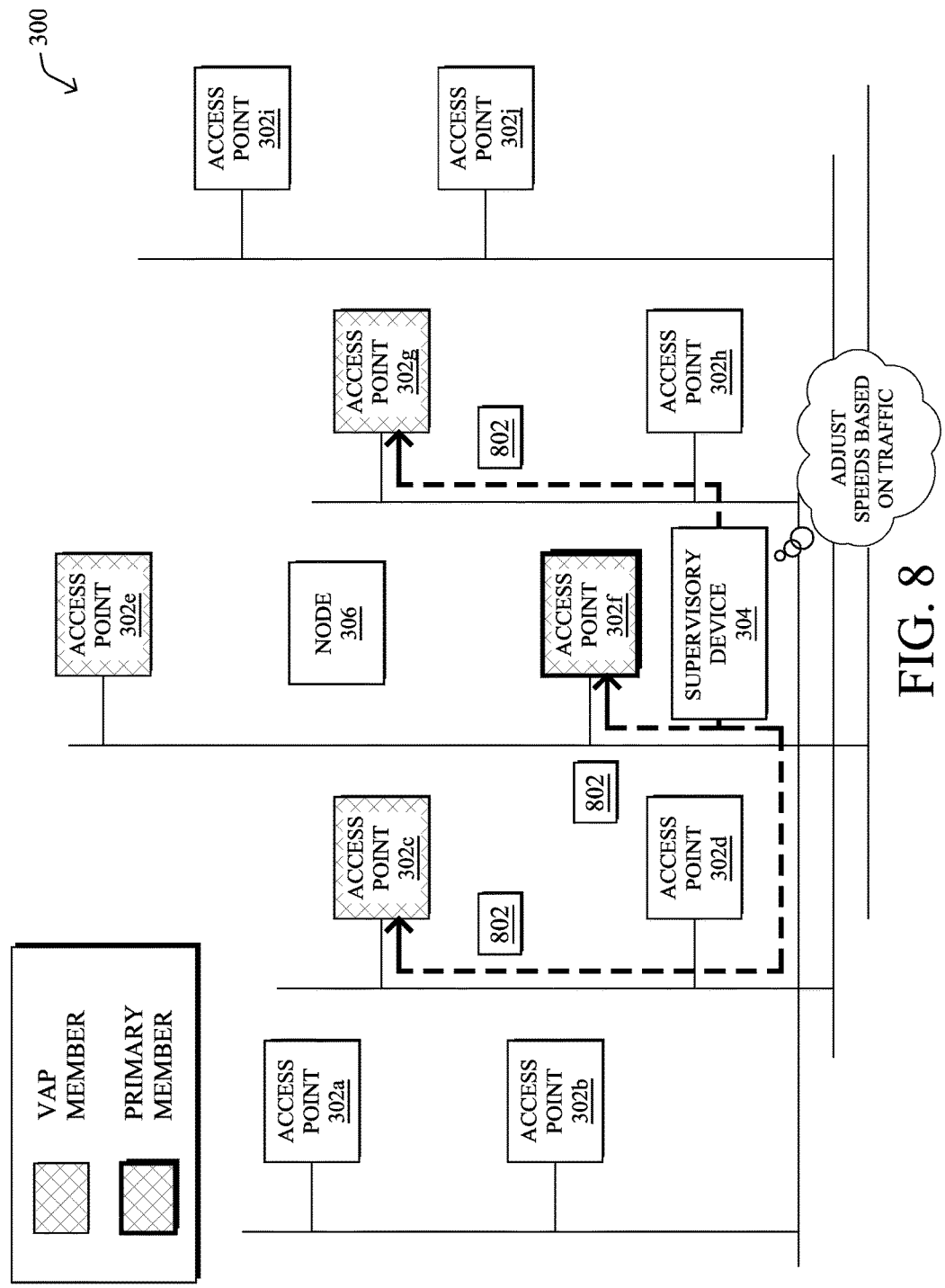
FIG. 8 illustrates a speed adjustment to a VAP.

As shown in FIG. 8, supervisory device 304, based on the traffic associated with node 306, may send out instructions 802 to VAP APs 302c, 302f, and 302g, to control their data rates based on the objective function(s) for node 306 and/or its traffic. In some cases, this decision may be made initially based on the type of node 306 and its expected traffic. For example, if node 306 is a security camera, it may be expected that it will transmit video/media streams through the network. In other cases, the traffic type may be determined as needed, such as by analyzing the traffic associated with node 306 (e.g., by sampling the traffic, by applying deep packet inspection to the traffic, etc.). In either case, the LMs of supervisory device 304 may seek to optimize the tradeoff between receiving APs and speed and, in turn, send instructions 802 to the VAP APs, instructing them to use a certain rate as part of the VAP.

FIG. 9 illustrates an example simplified procedure for managing data traffic in a VAP, according to various embodiments. For example, a non-generic, specifically configured device (e.g., device 200) may perform procedure 900 by executing stored instructions (e.g., process 248). Such a device may be, in some embodiments, a supervisory device such as a wireless controller in the network that oversees a plurality of APs in the network. The procedure 900 may start at step 905 and continue on to step 910 where, as described in greater detail above, the device may form a virtual access point (VAP) in the network for the node. A plurality of access points (APs) in the network are mapped to the VAP and the APs in the VAP mapping are treated as a single AP by the node for communicating with the network.

At step 915, as detailed above, the device may determine a data traffic management strategy for the node based on traffic associated with the node. In various embodiments, the management strategy may be based on whether the node is sending the traffic, whether the node is receiving the traffic, and/or the type of the traffic itself. For example, when the traffic is sent by the node, the device may determine that any or all of the receiving APs in the VAP mapping should report the received traffic to the device which can then eliminate duplicates, if any. In another example, when the traffic is sent to the node, the device may determine an ordering of the APs in the VAP mapping for purposes of sending retransmissions, so as to add spatial diversity to the sending when a transmission is not acknowledged by the node. In a further case, the device may use machine learning to optimize one or more objective functions for the type of the traffic associated with the node. For example, the device may attempt to optimize the tradeoff between member APs in the mapping and the data rate used by the APs, based on the traffic type.

As step 920, the device may instruct the APs in the VAP mapping to implement the data traffic management strategy, as described in greater detail above. In one embodiment, the device may multicast data destined for the node to the APs in the VAP mapping and instruct a selected one of the APs in the VAP mapping to transmit the data destined for the node towards the node. Each of the APs in the VAP may also be configured to report a reception acknowledgement to the device and sent by the node to acknowledge receipt of the transmitted data. In another embodiment, the device may instruct the APs in the VAP mapping to send copies of any received transmission from the node to the device, thereby increasing the chance of reception. In turn, the device may drop any duplicates. In further embodiments, the device may instruct the APs in the VAP mapping to use a certain data rate and/or adjust the membership in the VAP mapping, to accommodate the needs of the traffic type associated with the node. Procedure 900 then ends at step 925.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide data traffic management for a virtual access point (VAP). In particular, the techniques herein improve the delivery ratio and reduce the consequent jitter for the critical network data traffic by adding spatial diversity. This makes transmissions more deterministic and enables operational technology (OT) applications. At the same time, the techniques herein reduce the footprint on the channel of less critical traffic, thus limiting its impact on the latency of critical packets.

While there have been shown and described illustrative embodiments that provide techniques related to virtual access points (VAPs), it is to be understood that various other adaptations and modifications may be made within the spirit and scope of the embodiments herein. For example, while certain embodiments are described herein with respect to using certain environments, such as the IoT, other embodiments need not be limited to IoT devices. In addition, while certain protocols are shown, such as Wi-Fi, 802.15.4, LoRa, etc., other suitable protocols may be used, accordingly. For instance, while the techniques herein generally apply to a generalized CSMA/CA LLN, it should be specifically noted that the techniques can be applied to (based on) any of the standards mentioned above or known in the art. For ease of understanding (expecting the reader to be more familiar with the Wi-Fi parlance), the description above uses the term AP in the more general sense of a transceiver in a network. However, with Bluetooth LE, the central role illustratively maps to an AP, whereas the peripheral role is akin to the endpoint node. The same goes for the 802.15.4 PAN coordinator which is similar to an AP, and the full-function device (FFD) or reduced-function device (RFD) which illustratively map to an endpoint node, when 802.15.4 is used in plain hub-and-spoke (in that case a PAN ID illustratively serves as SSID). With DECT-ULE, the DECT Fixed Part is illustratively the AP, and the Portable Part is illustratively the node.

Note that some protocols on Wi-Fi networking refer to a "virtual access point" as many different things. For example, hosting several logical APs in one physical AP may be referred to as a "virtual access point", while turning a PC into an AP may also be referred to as a "virtual access point". The VAPs in this present disclosure should not be confused with the shared terminology, and is completely different in that one VAP herein is distributed over multiple physical APs, and there can be one VAP per node/STA.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   forming, by a supervisory device in a network, a virtual access point (VAP) for a node in the network, wherein a plurality of access points (APs) in the network are mapped to the VAP as part of a VAP mapping, and wherein the node treats the APs in the VAP mapping as a single AP for purposes of communicating with the network;
   determining, by the supervisory device, a data traffic management strategy for the node based on traffic associated with the node, wherein the data traffic management strategy is determined by a machine learning model that optimizes one or more objective functions associated with a traffic type of the traffic; and
   instructing, by the supervisory device, the APs in the VAP mapping to implement the data traffic management strategy for the node, wherein the data traffic management strategy adjusts the plurality of APs in the VAP mapping and a data rate used by the APs, based on the optimization of the one or more objective functions associated with the traffic type.

2. The method as in claim 1, wherein instructing the APs in the VAP mapping to implement the data traffic management strategy for the node comprises:
   instructing, by the supervisory device, the APs in the VAP mapping to send copies of a received transmission from the node to the supervisory device; and
   dropping, by the supervisory device, duplicate copies of a particular transmission from the node received via two or more of the APs in the VAP mapping based on sequence numbers assigned to the duplicate copies by the receiving two or more APs.

3. The method as in claim 2, wherein instructing the APs in the VAP mapping to implement the data traffic management strategy for the node further comprises:
   instructing, by the supervisory device, one of the APs in the VAP mapping to acknowledge receipt of the particular transmission from the node.

4. The method as in claim 1, wherein instructing the APs in the VAP mapping to implement the data traffic management strategy for the node comprises:
   multicasting, by the supervisory device, data destined for the node to the APs in the VAP mapping; and
   instructing, by the supervisory device, a selected one of the APs in the VAP mapping to transmit the data destined for the node towards the node, wherein each of the APs in the VAP is configured to report a reception acknowledgement to the supervisory device and sent by the node to acknowledge receipt of the transmitted data.

5. The method as in claim 4, wherein instructing the APs in the VAP mapping to implement the data traffic management strategy for the node further comprises:
   determining, by the supervisory device, that none of the APs in the VAP mapping received the reception acknowledgement from the node; and
   instructing, by the supervisory device, a selected secondary AP in the VAP mapping to retransmit the data to the node.

6. The method as in claim 1, wherein the supervisory device increases the plurality of APs in the VAP mapping and selects a lower data rate when the traffic type is interactive traffic and wherein the supervisory device decreases the plurality of APs in the VAP mapping and selects a higher data rate when the traffic type is media traffic.

7. The method as in claim 1, wherein the supervisory device is a wireless controller in the network.

8. An apparatus comprising:
   one or more network interfaces to communicate with a network;
   a processor coupled to the network interfaces and configured to execute one or more processes; and
   a memory configured to store a process executable by the processor, the process when executed configured to:
      form a virtual access point (VAP) for a node in the network, wherein a plurality of access points (APs) in the network are mapped to the VAP as part of a VAP mapping, and wherein the node treats the APs in the VAP mapping as a single AP for purposes of communicating with the network;
      determine a data traffic management strategy for the node based on traffic associated with the node, wherein the data traffic management strategy is determined by a machine learning model that optimizes one or more objective functions associated with a traffic type of the traffic; and
      instruct the APs in the VAP mapping to implement the data traffic management strategy for the node, wherein the data traffic management strategy adjusts the plurality of APs in the VAP mapping and a data rate used by the APs, based on the optimization of the one or more objective functions associated with the traffic type.

9. The apparatus as in claim 8, wherein the apparatus instructs the APs in the VAP mapping to implement the data traffic management strategy for the node by:
   instructing the APs in the VAP mapping to send copies of a received transmission from the node to the apparatus; and
   dropping duplicate copies of a particular transmission from the node received via two or more of the APs in the VAP mapping based on sequence numbers assigned to the duplicate copies by the receiving two or more APs.

10. The apparatus as in claim 9, wherein the apparatus further instructs the APs in the VAP mapping to implement the data traffic management strategy for the node by:

instructing one of the APs in the VAP mapping to acknowledge receipt of the particular transmission from the node.

11. The apparatus as in claim 8, wherein the apparatus instructs the APs in the VAP mapping to implement the data traffic management strategy for the node by:
multicasting data destined for the node to the APs in the VAP mapping; and
instructing a selected one of the APs in the VAP mapping to transmit the data destined for the node towards the node, wherein each of the APs in the VAP is configured to report a reception acknowledgement to the apparatus and sent by the node to acknowledge receipt of the transmitted data.

12. The apparatus as in claim 11, wherein the apparatus further instructs the APs in the VAP mapping to implement the data traffic management strategy for the node by:
determining that none of the APs in the VAP mapping received the reception acknowledgement from the node; and
instructing a selected secondary AP in the VAP mapping to retransmit the data to the node.

13. The apparatus as in claim 8, wherein the apparatus increases the plurality of APs in the VAP mapping and selects a lower data rate when the traffic type is interactive traffic and wherein the apparatus decreases the plurality of APs in the VAP mapping and selects a higher data rate when the traffic type is media traffic.

14. The apparatus as in claim 8, wherein the apparatus is a wireless controller in the network.

15. A tangible, non-transitory, computer-readable medium storing program instructions that, when executed by a supervisory device in a network to perform a process comprising:
forming, by the supervisory device in a network, a virtual access point (VAP) for a node in the network, wherein a plurality of access points (APs) in the network are mapped to the VAP as part of a VAP mapping, and wherein the node treats the APs in the VAP mapping as a single AP for purposes of communicating with the network;
determining, by the supervisory device, a data traffic management strategy for the node based on traffic associated with the node, wherein the data traffic management strategy is determined by a machine learning model that optimizes one or more objective functions associated with a traffic type of the traffic; and
instructing, by the supervisory device, the APs in the VAP mapping to implement the data traffic management strategy for the node, wherein the data traffic management strategy adjusts the plurality of APs in the VAP mapping and a data rate used by the APs, based on the optimization of the one or more objective functions associated with the traffic type.

16. The computer-readable medium as in claim 15, wherein the supervisory device is a wireless controller in the network.

* * * * *